United States Patent [19]

Feng et al.

[11] Patent Number: 5,783,811

[45] Date of Patent: Jul. 21, 1998

[54] PORTABLE DATA COLLECTION DEVICE WITH LED TARGETING AND ILLUMINATION ASSEMBLY

[75] Inventors: Chen Feng; Ynjiun P. Wang, both of Fort Myers, Fla.

[73] Assignee: Metanetics Corporation, Fort Myers, Fla.

[21] Appl. No.: 606,619

[22] Filed: Feb. 26, 1996

Related U.S. Application Data

[63] Continuation-in-part of Ser. No. 603,848, Feb. 22, 1996, Ser. No. 580,063, Dec. 20, 1995, Pat. No. 5,703,349, Ser. No. 544,618, Oct. 18, 1995, Pat. No. 5,702,059, and Ser. No. 494,435, Jun. 26, 1995.

[51] Int. Cl.$^6$ ........................................................... G06K 7/10
[52] U.S. Cl. ................................................. 235/472; 235/462
[58] Field of Search ....................................... 235/462, 472, 235/459, 454, 467, 463

[56] References Cited

U.S. PATENT DOCUMENTS

| | | |
|---|---|---|
| 4,210,802 | 7/1980 | Sakai . |
| 4,409,470 | 10/1983 | Shepard et al. . |
| 4,734,566 | 3/1988 | Senda et al. ............................. 235/455 |
| 4,766,300 | 8/1988 | Chadima, Jr. et al. . |
| 4,835,615 | 5/1989 | Taniguchi et al. . |
| 4,877,949 | 10/1989 | Danielson et al. ....................... 235/462 |
| 4,952,966 | 8/1990 | Ishida et al. . |
| 4,962,432 | 10/1990 | Ohtsuka et al. . |
| 4,996,413 | 2/1991 | McDaniel et al. . |
| 5,010,580 | 4/1991 | Vincent et al. . |
| 5,019,699 | 5/1991 | Koenck . |
| 5,025,319 | 6/1991 | Mutoh et al. . |
| 5,080,456 | 1/1992 | Katz et al. . |
| 5,083,150 | 1/1992 | Nagasaki et al. . |
| 5,128,769 | 7/1992 | Aria et al. . |
| 5,130,520 | 7/1992 | Shepard et al. . |
| 5,131,053 | 7/1992 | Bernzott et al. . |

(List continued on next page.)

FOREIGN PATENT DOCUMENTS

| | | |
|---|---|---|
| 60-129891 | 7/1985 | Japan . |
| 63-67692 | 3/1988 | Japan . |
| 63-83886 | 4/1988 | Japan . |
| 60-264383 | 10/1990 | Japan . |
| 3-198175 | 8/1991 | Japan . |
| 5-242287 | 9/1993 | Japan . |
| 6-162247 | 6/1994 | Japan . |

OTHER PUBLICATIONS

PCT International Search Report dated Sep. 18, 1996 (two pages).
PCT International Search Report date Nov. 7, 1996 (one page).

*Primary Examiner*—Donald T. Hajec
*Assistant Examiner*—Thien Minh Le
*Attorney, Agent, or Firm*—Watts, Hoffman, Fisher & Heinke Co. L.P.A.

[57] ABSTRACT

The device includes an imaging assembly including a two dimensional (2D) photosensor array overlied by a RGB color filter. The imaging assembly includes an illumination assembly providing a relatively uniform illumination pattern over an imaging target area. The illumination assembly includes a plurality of sets of surface mount illumination LEDs mounted on a board and a spaced apart lens array for focusing the LEDs on the target area. The lens array includes orthogonal cylindrical optical entry and exit surfaces aligned with each of the illumination LED sets. The optical entry surface defines illumination intensity distribution horizontally while the optical exit surface defines illumination intensity distribution vertically. The board also supports a pair of spaced apart targeting LEDs. The lens array includes aspherical optical entry surfaces and cylindrical optical exit surfaces aligned with each of the targeting LEDs. The cylindrical optical exit surfaces are tipped with respect to their corresponding aspherical optical entry surfaces and are orthognal to each other providing an orgthogonal or "crosshairs" illumination pattern for aiming the imaging assembly at a target.

20 Claims, 10 Drawing Sheets

U.S. PATENT DOCUMENTS

| | | |
|---|---|---|
| 5,168,149 | 12/1992 | Dvorkis et al. .................... 235/472 |
| 5,184,005 | 2/1993 | Ukai et al. ........................ 235/472 |
| 5,187,356 | 2/1993 | Chadima, Jr. et al. . |
| 5,200,597 | 4/1993 | Eastman et al. . |
| 5,210,398 | 5/1993 | Metlitsky . |
| 5,235,167 | 8/1993 | Dvorkis et al. ................ 235/472 X |
| 5,237,365 | 8/1993 | Miyazawa . |
| 5,243,666 | 9/1993 | Hasfeave et al. . |
| 5,245,445 | 9/1993 | Fujisawa et al. . |
| 5,258,604 | 11/1993 | Behrens et al. . |
| 5,262,871 | 11/1993 | Wilder et al. . |
| 5,272,538 | 12/1993 | Homma et al. . |
| 5,276,315 | 1/1994 | Surka . |
| 5,278,397 | 1/1994 | Barken et al. . |
| 5,291,009 | 3/1994 | Roustaei . |
| 5,293,238 | 3/1994 | Nakano et al. . |
| 5,296,690 | 3/1994 | Chandler et al. . |
| 5,308,960 | 5/1994 | Smith et al. . |
| 5,308,966 | 5/1994 | Danielson . |
| 5,309,243 | 5/1994 | Tsai . |
| 5,314,631 | 5/1994 | Katoh et al. .................. 235/472 X |
| 5,315,095 | 5/1994 | Maron et al. . |
| 5,319,181 | 6/1994 | Shelhammer et al. . |
| 5,331,143 | 7/1994 | Maron et al. . |
| 5,332,892 | 7/1994 | Li et al. . |
| 5,340,973 | 8/1994 | Knowles et al. .................... 235/472 |
| 5,345,266 | 9/1994 | Denyer . |
| 5,349,172 | 9/1994 | Roustaei . |
| 5,352,884 | 10/1994 | Petrick et al. . |
| 5,354,977 | 10/1994 | Roustaei . |
| 5,359,185 | 10/1994 | Hason . |
| 5,386,271 | 1/1995 | Maekawa et al. . |
| 5,401,949 | 3/1995 | Ziemacki et al. . |
| 5,406,063 | 4/1995 | Jelen . |
| 5,408,084 | 4/1995 | Brandorff et al. . |
| 5,414,251 | 5/1995 | Durbinn ...................... 235/472 X |
| 5,418,357 | 5/1995 | Inoue et al. ................. 235/470 X |
| 5,420,635 | 5/1995 | Konishi et al. . |
| 5,420,943 | 5/1995 | Mak . |
| 5,448,293 | 9/1995 | Kogane et al. . |
| 5,468,947 | 11/1995 | Danielson et al. . |
| 5,468,950 | 11/1995 | Hanson . |
| 5,484,994 | 1/1996 | Roustaei . |
| 5,486,688 | 1/1996 | Iiwa et al. ....................... 235/462 |
| 5,496,992 | 3/1996 | Madan et al. . |
| 5,504,316 | 4/1996 | Bridgelall et al. ............ 235/472 X |
| 5,559,555 | 9/1996 | Shimzu et al. . |
| 5,637,856 | 6/1997 | Bridgelall et al. ................ 235/472 |

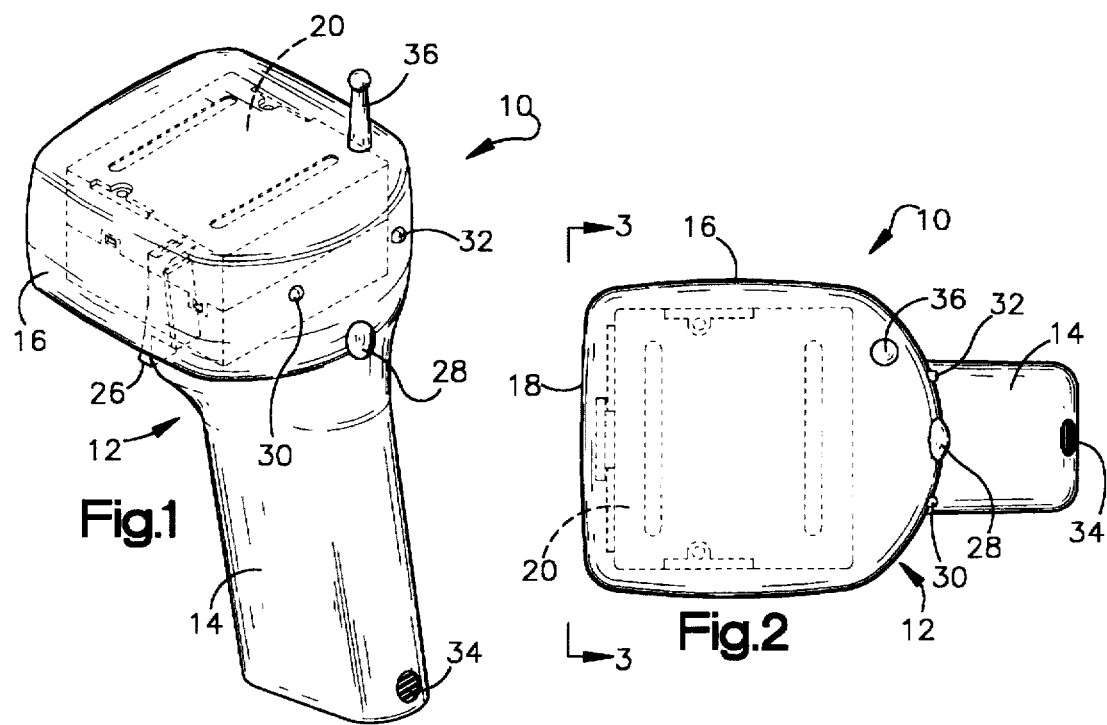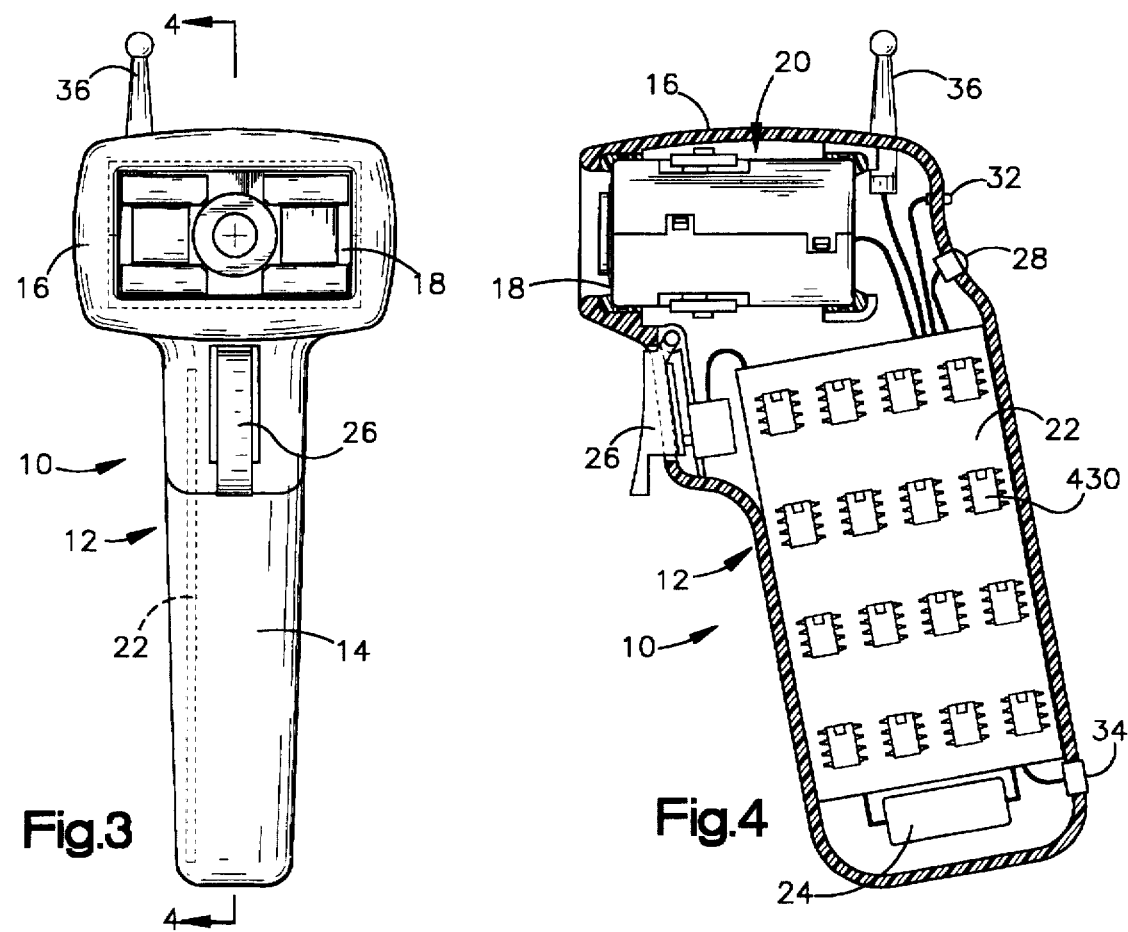

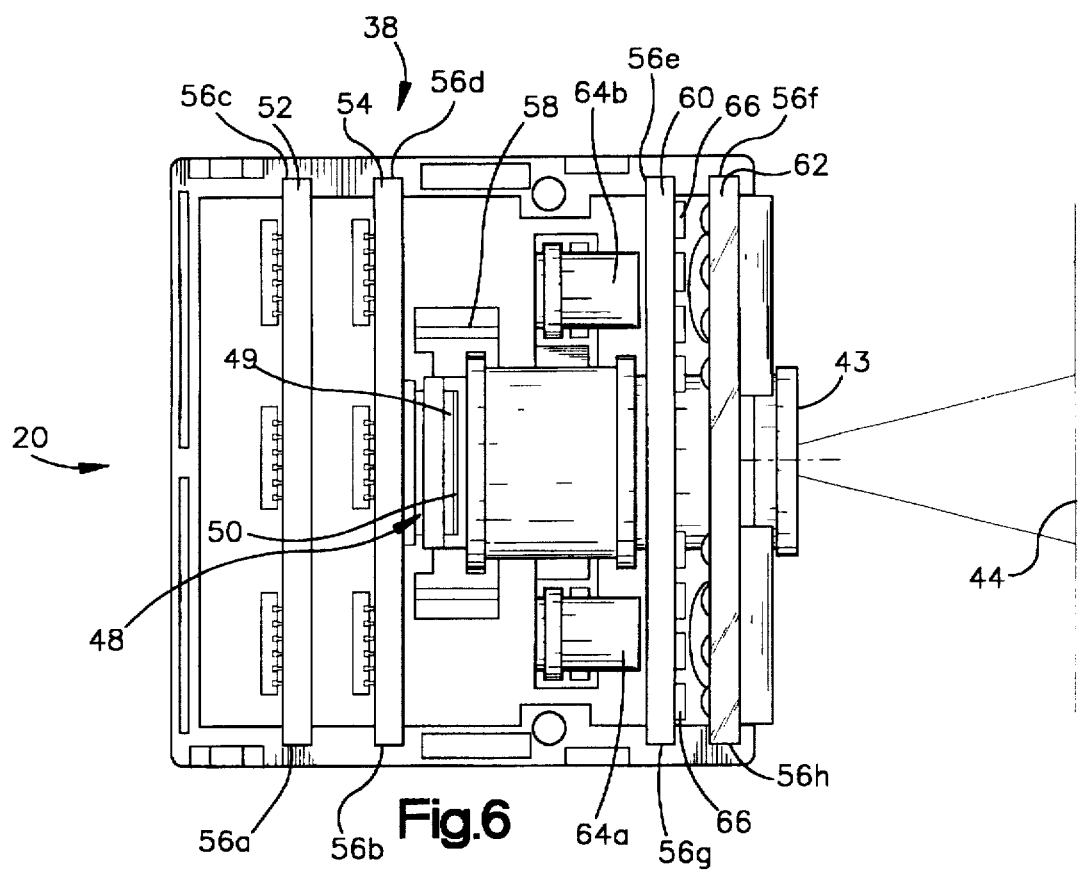

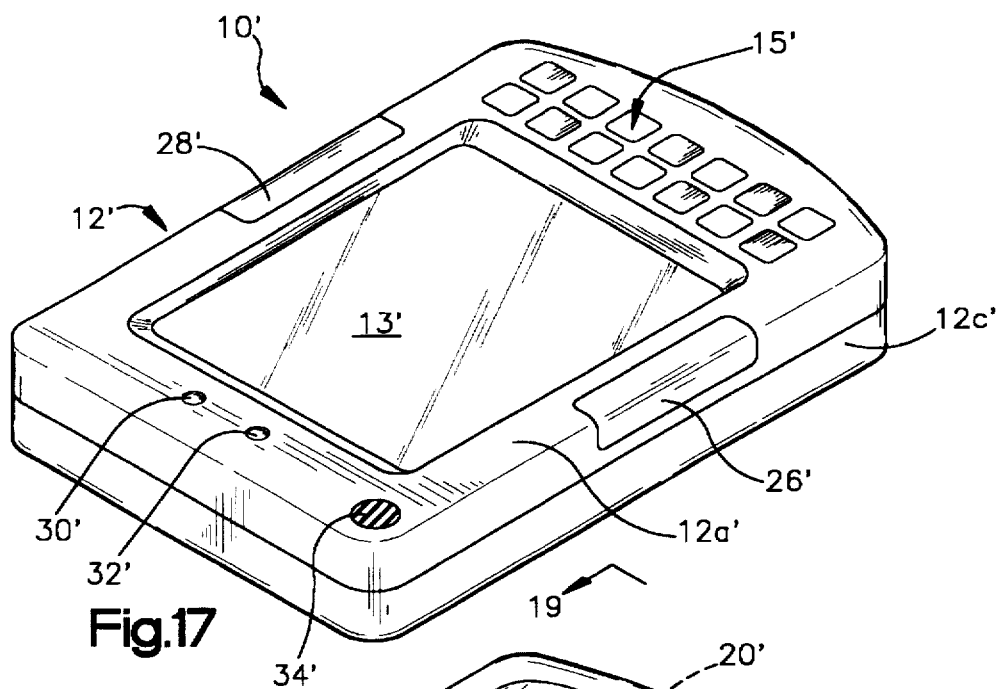
Fig.17
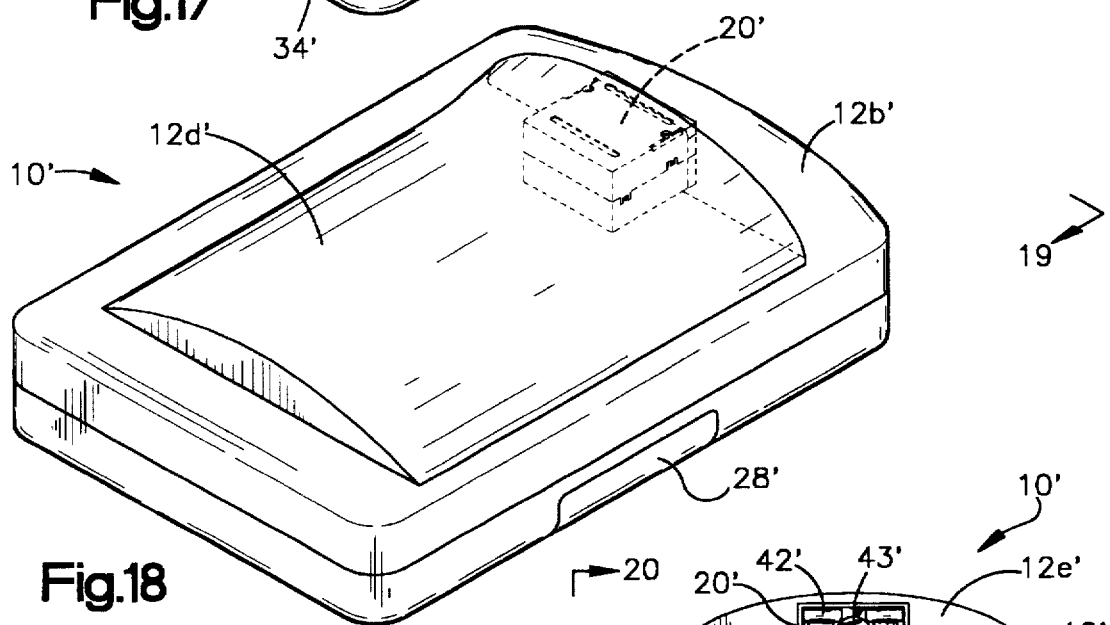
Fig.18
Fig.19
Fig.20

PORTABLE DATA COLLECTION DEVICE WITH LED TARGETING AND ILLUMINATION ASSEMBLY

CROSS REFERENCE TO RELATED APPLICATIONS

This application is a continuation-in-part of application Ser. No. 08/603,848, filed Feb. 22, 1996, entitled "Portable Data Collection Device with Dataform Decoding and Image Capture Capability, and is also a continuation-in-part of application Ser. No. 08/580,063, filed Dec. 20, 1995 now U.S. Pat. No. 5,703,345, entitled "Portable Data Collection Device with Two Dimensional Imaging Assembly" and is also a continuation-in-part of application Ser. No. 08/544,618, filed Oct. 18, 1995, now U.S. Pat. No. 5,702,059 entitled "Extended Working Range Dataform Reader Including Fuzzy Logic Image Control Circuitry" and is also a continuation-in-part of application Ser. No. 08/494,435, filed Jun. 26, 1995, entitled "Extended Working Range Dataform Reader". Each of the aforesaid applications is incorporated herein in its respective entirety by reference.

FIELD OF THE INVENTION

The present invention relates to a portable data collection device including a two dimensional color photosensor array imaging assembly and, more particularly, to a portable data collection device having a two dimensional color photosensor array imaging assembly selectively actuatable to read a bar code dataform and record an image of an item of interest.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1D bar code dataforms, that is, bar codes consisting of a single row of contrasting black bars and white spaces of varying widths. Both of these readers are also capable of reading a "stacked" two dimensional (2D) bar code dataforms such as PDF417, which has row indicator patterns utilized by the reader for vertical synchronization.

A two dimensional (2D) imaging based dataform reader has been proposed in U.S. application Ser. No. 08/544,618, filed Oct. 18, 1995 and entitled "Extended Working Range Dataform Reader Including Fuzzy Logic Image Control Circuitry". The 2D dataform reader disclosed in application Ser. No. 08/544,618 which is assigned to the assignee of the present application, includes an imaging assembly having a two dimensional array of photosensor (also referred throughout as photodiodes or pixels) adapted to read 2D bar code dataforms (e.g., PDF417, Supercode, etc.) with vertical synchronization row indicator patterns as well as matrix dataforms (e.g., MaxiCode, Data Matrix, Code 1, etc.) which do not include vertical synchronization patterns. The 2D dataform reader disclosed in application Ser. No. 08/544,618 utilizes an open loop feedback control system including fuzzy logic circuitry to determine proper exposure time and gain parameters for a camera assembly.

While using a portable data collection device to sequentially read bar code dataforms affixed to products or containers in a production facility, warehouse or retail store, an operator may come upon an item which is damaged, incomplete, mislabeled, in the wrong location, etc. In such a event, it would be desirable for the operator to make a note of the problem item so that appropriate corrective action may be taken by supervisory personnel. However, requiring the operator to make a handwritten notation on a clipboard or input information concerning the item using a keyboard or keypad of the portable data collection device is both time consuming and error prone.

What is needed is a portable data collection device having a 2D imaging assembly that can be actuated to read bar code dataforms by depressing a trigger and, when a problem item is found, the imaging assembly can be actuated with a separate trigger to record an image of the problem item. This would enable "information", that is, an image of the problem item, to be recorded without seriously interrupting the normal course of the operator's work. Additionally, it would be desirable to transmit the recorded image of the problem item to appropriate supervisory personnel so that appropriate corrective action may be taken. In certain instances, it may be sufficient to record a single frame of the image of a problem item, while in other cases, for example, if the item is larger than a field of view or target area of the imaging assembly, it may be necessary to record a continuous video image of the problem item to permit the operator to record a complete view of the item. It would also be desirable to provide an audio capture module to simultaneously capture the operator's voice, enabling the operator to provide further identification and/or commentary on the problem item to aid supervisory personnel in locating the item and taking appropriate corrective action.

Furthermore, in package delivery applications, upon delivery of a package, the delivery person typically uses a portable data collection device to read a bar code dataform affixed to the delivered package. Normally, the delivery person also obtains a signature of the person receiving the package. Typically, the signature of the person receiving the package is on a sheet of paper that must be filed with the package delivery records or on a signature capture digitizer pad so that the signature may electronically filed.

What is needed is a portable collection data device having a 2D imaging assembly that can be actuated to read a bar code dataform by depressing one trigger and can be actuated by a separate trigger, or applications software, to record an image of a signature of a person receiving a package so that the signature can be filed electronically.

As an alternative to using one trigger to read a bar code dataform and using the second trigger to image an adjacent signature block with a recipient's signature included therein a single trigger could be used to decode a dataform and capture an image of the recipient's signature, the dataform could be encoded if the signature block is at a predetermined position with respect to the dataform, a signal image may include both the dataform and the signature block. What is needed is a portable data collection device that can be actuated by a single trigger to capture an image of a bar code dataform and an adjacent signature block, decode the bar code dataform, determine the position of the signature block, and output a compressed digitized representation of the portion of the image comprising the signature block for subsequent downloading to a remote device.

Furthermore, it would be desirable if the portable data collection device included a color imaging system to record a color image or series of images using a "color photosensor array." Typical "color photosensor arrays" include a red, green and blue (RGB) microfilter overlying a traditional 2D photosensor array to provide for color image data. A typical color filter for a 2D photosensor array comprises a matrix of positions overlying corresponding a pixel positions. Typically, 50% of the positions are green, 25% of the positions are red and the remaining 25% of the positions are blue. Unfortunately, the color of a filter position effects the transmittivity of light through that position and, therefore, the intensity of illumination incident on a photosensor or pixel overlied by the filter position.

The charge accumulating on a given photosensor over an exposure period is dependent on the intensity of illumination incident on that photosensor. An imaging assembly utilizing a charge coupled device to read out charges accumulated on photosensors accumulated over an exposure period convert the charges accumulated on individual photosensors to an analog voltage signal and an A/D converter converts the signal into digital gray scale values representing a frame of a captured image and stores the gray scale values in a frame buffer memory. The gray scale values of the pixels within the frame are analyzed by the imaging system to identify a dataform pattern, which is subsequently decoded by decoding circuitry of the imaging assembly.

Because a color filter differentially alters the illumination intensity incident on a photosensor depending on whether the photosensor is overlied by a red, green or blue filter position, the resulting gray scale value would also be altered. Accordingly, the addition of a color filter to a photosensor array would decrease an imaging system's ability to accurately identify and decode a dataform imaged in a captured frame image, that is, imaging in color would decrease the effective resolution of the imaging assembly, i.e., the assembly's ability to read of a dataform in a captured image frame.

What is need is portable data collection device including a color imaging system with a color filter wherein the imaging system includes compensation circuitry to compensate for the variation in light transmittivity of different colored filter positions so that a dataform in a captured image may be accurately identified and decoded by the imaging system.

SUMMARY OF THE INVENTION

In accordance with this invention, a portable data collection device is provided that includes a two dimensional (2D) photosensor array color imaging assembly selectively actuatable for reading bar code dataforms (bar code dataform reading mode) and recording an image of an item in the imaging assembly's target area or field (imaging mode). The portable data collection device includes two trigger switches, a first trigger actuatable for reading a bar code dataform and a second trigger actuatable for recording an image of an item in the target area. In a radio embodiment of the portable data collection device of the present invention, a radio module is provided for transmitting an output signal to a remote device. In a batch embodiment of the portable data collection device of the present invention, an output signal is coupled to a terminal processing board for further processing and storage.

The imaging assembly of the portable data collection device of the present invention further includes control and selection circuitry which receives input signals from a user of the portable data collection device and determines and formats an appropriate output signal. The output signal may include data from a decoded dataform imaged in a captured image frame, a compressed representation of a captured color image, an uncompressed representation of a captured color image, or a combination of these. If the desired output signal is decoded dataform data, the selection circuitry may utilize compensation circuitry to adjust the gray scale value of each pixel in a captured image frame to emulate the image that would have been captured by a black and white photosensor array.

Alternately, if the desired output signal is to represent a color image of a field of view of a camera assembly of the imaging assembly, the selection circuitry bypasses the compensation circuitry and stores a digital representation of the captured color image in the buffer memory, then, if appropriate, invokes a compression module to compress the image to reduce the quantity of data to be transmitted by a radio module of the portable data collection device to a remote device or to be output to a terminal processing board of the portable data collection device.

As discussed, the portable data collection device of the present invention includes two manually activated trigger switches for controlling the selection circuitry to select between a color imaging capture mode and a dataform decoding mode. A first trigger switch, the dataform decoding trigger, institutes the dataform decoding mode and signals the selection circuitry to output a decoded representation of a dataform in a captured image frame. The second trigger switch, the imaging trigger, institutes the imaging mode and has two operating embodiments. In the first operating embodiment of the imaging mode, depressing the imaging trigger results in the imaging assembly capturing one frame of the field of view or target area of the camera assembly. In the second operating embodiment of the imaging mode, depressing the imaging trigger results in the imaging assembly continuously capturing successive frames as long as the trigger is depressed.

In a third operating embodiment of the portable data collection device of the present invention, activation of the dataform reading trigger will result in both decoded data and at least a portion of the captured image frame being output. This embodiment would advantageously be employed in a situation where a dataform is associated with, for example, a signature block in proximity to the dataform wherein the dataform includes encoded data setting forth the position of the signature block with respect to some predetermined location on the dataform. When the dataform decoding trigger is actuated, an image of the dataform and associated signature block is captured. The dataform is decoded and the decoded data is analyzed by the selection circuitry to determine the location of the signature block. The output signal includes both the decoded data and an image of the signature block.

Advantageously, the portable data collection device of the present invention includes an voice capture module which captures and digitizes sound received through a microphone mounted on the device during actuation of the second trigger. This feature enables an operator to "attach" a verbal message to the captured image. The digitized signal representing the captured sound portion is processed by a voice compression module prior to output to the radio module or the terminal processing board.

The imaging assembly includes a camera assembly having a photosensor array assembly including a two dimensional (2D) array of photosensors or pixels overlied by a color RGB (red, green and blue) filter and a control and decoder board. The control and decoder board includes high resolution black and white compensation circuitry, decoding circuitry, image compression circuitry, control and selection circuitry, serial output circuitry and exposure parameter control circuitry and image buffering circuitry including signal processing circuitry, a frame buffer memory and memory scanner/synchronization generator circuitry. The signal processing circuitry includes synchronization extractor circuitry and an analog to digital (A/D) converter for converting a composite video signal generated by the camera assembly to a digital signal. The decoding circuitry includes a decoder for decoding 1D and 2D bar code dataforms. The exposure parameter control circuitry includes fuzzy logic control circuitry for controlling the frame exposure period and gain adjustment of the camera assembly.

The imaging assembly further includes an illumination assembly for illuminating a target item in the imaging assembly target area and an optic assembly for focusing reflected light from the target area upon the 2D array of photosensors of the photosensor array assembly.

The optic assembly includes a plurality of lens positioned to the front of the 2D photosensor array for focusing reflected light from the target area onto the photosensor array. A shroud supports the optic assembly and shrouds ambient illumination from the photosensor array. The camera assembly includes the 2D photosensor array, exposure period control circuitry and gain control circuitry mounted on a printed circuit board. The illumination assembly includes an array of LED illuminators for uniformly illuminating the target area and two targeting LED illuminators for generating a cross hair illumination intensity pattern for aiming the portable data collection device appropriately.

In a first housing embodiment of the portable data collection device of the present invention, the device includes pistol-grip shaped housing enclosing circuitry of the device. An angled snout extending from a grip portion of the housing includes an opening through which a portion of the illuminator module and optics assembly extends. A finger operated trigger is provided on a target facing surface of the housing. The trigger is depressed by an operator to actuate the imaging assembly to read a bar code dataform in the target area. A push button actuator extends through an opening of the housing spaced apart from the trigger. The push button actuator is located so as to be depressible by the operator's thumb as the housing is cradled in the operator's hand. Depressing the push button actuator actuates the imaging assembly to capture an image of the target area.

In a second housing embodiment of the portable data collection device of the present invention, a thin rectangular shaped housing supports a workslate computer. The workslate computer includes an interactive display screen and a keypad supported by a top surface of the housing. The housing defines an interior region which encloses circuitry of the device. A side surface of the housing includes an opening through which a portion of the illumination assembly and optic assembly extend. Two push button actuators are provided on opposite sides of the display screen. One actuator actuates the imaging assembly to read a bar code dataform in the target area, while the other actuator actuates the imaging assembly to capture an image of the target area.

The aforementioned and other aspects of the present invention are described in more detail in the detailed description and accompanying drawings which follow.

BRIEF DESCRIPTION OF THE DRAWINGS

FIG. 1 is a perspective view of a first embodiment of a portable data collection device of the present invention;

FIG. 2 is a top view of the portable data collection device of FIG. 1;

FIG. 3 is a front elevation view of the portable data collection device of FIG. 1 as seen from a plane indicated by the line 3—3 in FIG. 2;

FIG. 4 is a sectional view of the portable data collection device of FIG. 1 as seen from a plane indicated by the line 4—4 in FIG. 3;

FIG. 6 is a view of the modular portion of the imaging assembly of FIG. 5 with an upper half of the housing removed;

FIG. 8 is a sectional view of the front panel of the illumination assembly of FIG. 7 as seen from a plane indicated by the line 8—8 in FIG. 7;

FIG. 9 is a sectional view of the front panel of the illumination assembly of FIG. 7 as seen from a plane indicated by the line 9—9 in FIG. 7;

FIG. 10 is a sectional view of the front panel of the illumination assembly of FIG. 7 as seen from a plane indicated by the line 10—10 in FIG. 7;

FIG. 17 is a perspective view of a top side of a second embodiment of a portable data collection device of the present invention;

FIG. 18 is another perspective view of a bottom side of the portable data collection device of FIG. 17;

FIG. 19 is a side elevation view of the right side of the portable data collection device of FIG. 17 as seen from a plane indicated by the line 19—19 in FIG. 18; and FIG. 20 is a side elevation view of the left side of the portable data collection device of FIG. 17 as seen from a plane indicated by the line 20—20 in FIG. 19.

DETAILED DESCRIPTION

Figure 5:
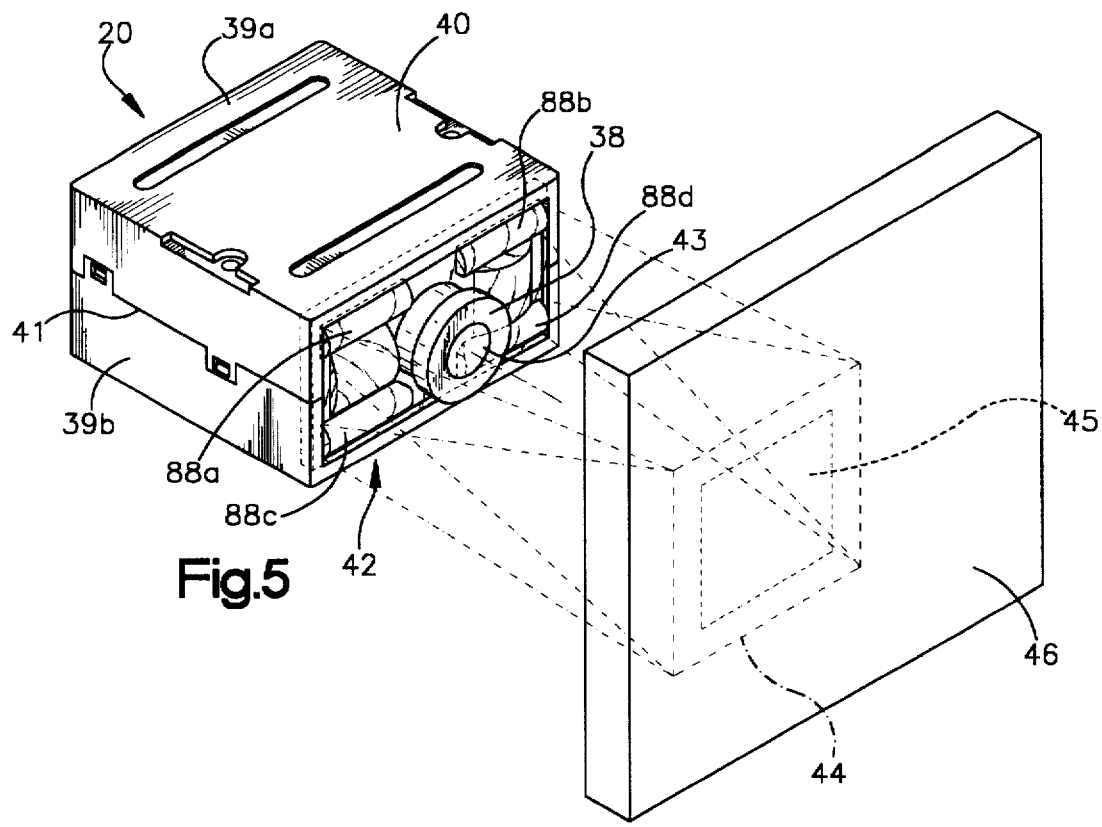
FIG. 5 is a perspective view of a modular portion of an imaging assembly of the portable data collection device of the present invention, the modular portion shown imaging a target dataform on an item.

Turning to the drawings, a portable data collection device in accordance with the present invention is shown at 10 in FIGS. 1–4. The data collection device 10 includes a housing 12 defining an interior region. The housing 12 includes a gripping portion 14 sized to be grasped in the hand of an operator and an angled snout 16 extending from the gripping portion. The snout 16 includes an opening through which a portion of a two dimensional (2D) photosensor array imaging assembly 18 extends. The imaging assembly 18 includes a modular portion 20 and a control and decoder board 22 electrically coupled to the electronic circuitry in the modular portion. The control and decoder board 22 is supported within the gripping portion 14 of the housing 12. Also supported within the housing gripping portion 14 is a power source 24 such as a rechargeable battery for supplying operating power to the portable data collection device 10.

A dataform reading trigger switch or actuator 26 extends through an opening in the gripping portion 14. Also extending through an opening in the gripping portion 14 is an imaging push button trigger switch or actuator 28. The dataform reading trigger 26 is positioned to be depressed by an index finger of the operator while the gripping portion 14 of the housing 12 is held in the operator's hand. The imaging trigger 28 is positioned to be depressed by a thumb of an operator while the gripping portion 14 of the housing 12 is held in the operator's hand.

The gripping portion 14 also includes two small openings through which a distal portion of a red light emitting diode (LED) indicator 30 and a distal portion of a green LED indicator 32 extend. Finally, the housing 12 includes an opening exposing a portion of a microphone 34 mounted in the housing interior region and another opening through which a radio antenna 36 extends. The interior region of the housing 12 supports the imaging assembly 18 and other electronic circuitry to be described below.

Referring to FIG. 5, which shows a perspective view of the module portion 20 of the imaging assembly 18, it can be seen that the module portion includes a housing 40 which supports an illumination assembly 42 and a camera assembly 38. The housing 40 includes an upper portion 39a and a lower portion 39b which advantageously are the same part positioned symmetrically about a part line 41. The camera assembly 38 includes an optic assembly 43 which focuses an image of a target area 44 onto a photosensor array assembly 48 (discussed later). As can best be seen in FIG. 7, the illumination assembly 42 includes four illumination optic portion 88a, 88b, 88c, 88d each of which projects an even intensity distribution of illumination across the target area 44. FIG. 6 is a top view of the modular portion 20 with the upper portion 39a of the housing 40 removed. The camera assembly 38 includes a rear printed circuit board 52 and a front printed circuit board 54, both of which are secured in the housing 40 in slots 56a, 56b, 56c, 56d.

A two dimensional color photosensor array assembly 48, including a 2D sensor array 49 with an overlying RGB filter 50 is positioned on the front surface of the front printed circuit board 54 and receives reflected illumination from the target area 44 focused through optic assembly 43. A shroud 58 (FIG. 11) positions the optic assembly 43 with respect to photodetector array assembly 48 and shrouds ambient illumination from the photodetector array assembly 48. As can best be seen in FIG. 7, the illumination assembly 42 includes a printed circuit board 60, a lens array 62 and two targeting LEDs 64a, 64b. A plurality of exposure LEDs 66 are disposed on the front surface of printed circuit board 60 to direct illumination through the lens array 62 towards the target area 44. The circuit board 60 and the lens array 62 are secured in slots 56e, 56f, 56g, 56h in the upper and lower housing portion 39a, 39b. Securing the camera assembly 38 and the illumination assembly in the same housing 40 assures that illumination is properly directed into the target area 44.

Figure 11:
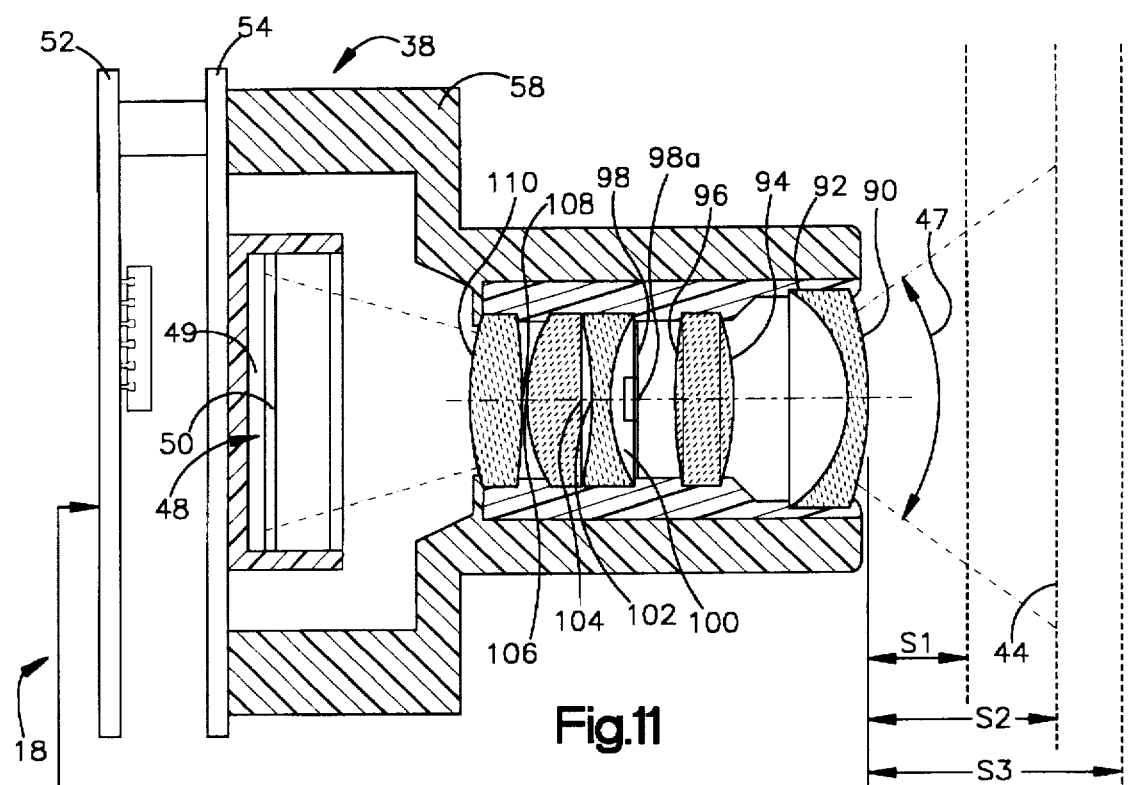
FIG. 11 is a sectional view of an optic assembly of the modular portion of the imaging assembly of FIG. 5.

FIG. 11 shows a cross section of the camera assembly 38 with optic assembly 43 focusing an image of the target area 44 onto photosensor array assembly 48. The performance of the portable data collection device 10 is enhanced by the optic assembly 43 which provides the camera assembly 38 with an extended working range. Based on the distance between the optic assembly 43 and the photosensor array assembly 48, there exists a best focus position S2 in front of the forward most surface 90 of the optic assembly 43 at which an image of an object in the target area 44 will be focused sharpest on the photosensor array 49. The image sharpness gradually degrades as the object is moved towards a near field cut off distance S1 and a far field cut off distance S3. The optic assembly 43 has an angular field of view 47 which is wide enough to image large dataforms at the far field S3 and still provide a large image of a small dataform at the near field S1. In the preferred embodiment, the portable data collection device 10 has a working range from about 2.5 inches to at least 8.5 inches from a front surface 90 of the optic assembly 43 with the best focus distance S2 being about 5.5 inches (approximately 140 mm) from the front surface 90. The preferred field of view corresponds to a target area or surface 5 inches long by 3.75 inches high at a distance of 8.5 inches from the front surface 90.

The preferred optic assembly 43 includes 5 lenses and a metal disk 98 having a pin hole aperture 98a which, as shown, includes eleven optical surfaces labeled 90–110. In the preferred embodiment the rear most optic surface 110 is positioned 10.2 mm to the front of the photosensor array 49. The best focus position is at 140 mm to the front of the front optic surface 90.

The optic prescriptions for each of the optic surfaces are as follows

| Optic Surface | Radius of Surface Curvature | Diameter | Shape |
| --- | --- | --- | --- |
| 90 | R = 13.52 mm | D = 8.8 mm | convex |
| 92 | R = 5.3 mm | D = 8.8 mm | concave |
| 94 | R = 12.47 mm | D = 7 mm | convex |
| 96 | R = 19.9 mm | D = 7 mm | convex |
| 98 | Pinhole diameter 0.81 mm | | |
| 100 | R = 6.76 mm | D = 7 mm | concave |
| 102 | R = 12.47 mm | D = 7 mm | concave |
| 104 | R = 158.52 mm | D = 7 mm | convex |
| 106 | R = 6.76 mm | D = 7 mm | convex |
| 108 | R = 28.08 mm | D = 7 mm | convex |
| 110 | R = 11.26 mm | D = 7 mm | convex |

The distance between successive optical surfaces 90–110 is as follows:

| Optic Surface | Distance |
| --- | --- |
| 90–92 | .77 mm |
| 92–94 | 4.632 mm |
| 94–96 | 2.32 mm |
| 96–98 | 1.798 mm |
| 98–100 | .805 mm |
| 100–102 | 0.77 mm |
| 102–104 | 0.327 mm |
| 104–106 | 2.34 mm |
| 106–108 | 0.178 mm |
| 108–110 | 2.07 mm |

Such an optic assembly is available from Marshall Electronics, Inc. of Culver City, Calif.

An alternate optic assembly which includes a compact aspheric plastic doublette design can be found in U.S. patent application Ser. No. 08/494,435 entitled "Extended Working Range Dataform Reader." Application Ser. No. 08/494,435 is assigned to the same assignee as the present invention and is incorporated herein by reference.

Because the desired working range and field of view of the collection device 10 dictates that the optics assembly 43 have a large F# (F#5.6 or greater), the illumination assembly 42 must provide adequate illumination of the target area 44 during the exposure period so that enough reflected light is absorbed by the photosensor array 49 to generate a suitably bright image. However, the exposure period is normally limited to 0.01 seconds or less to minimize the smear effect of an operator's hand jittering during the dataform reading session. Therefore, the illumination assembly 42 must provide adequate illumination to accommodate the large F# and short exposure time.

Proper exposure of the photosensor array 49 requires an object field illumination of 0.3 lux assuming an exposure period of 0.03 seconds and an F#1.2. To determine the proper object field illumination for a 0.01 second exposure period and an F#13, the following formula is used:

$$\frac{(\text{Illumination intensity}) (\text{Exposure period})}{(F\#)^2} = \text{Constant}$$

Therefore, the minimum required object field illumination for this invention is 106 lux at the far field cut off distance S3.

Figure 7:
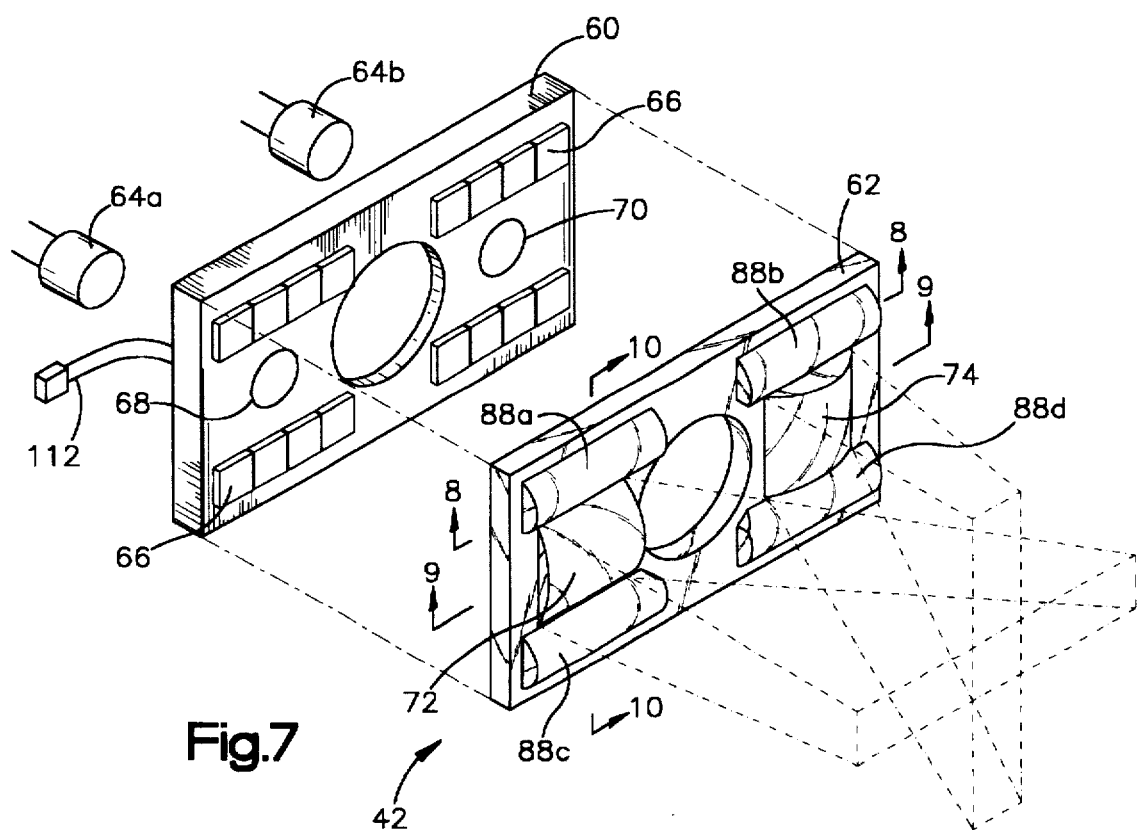
FIG. 7 is an exploded perspective view of an illumination assembly of the modular portion of the imaging assembly of FIG. 5.

Referring to FIG. 7, which is an exploded perspective view of the illumination assembly 42, the assembly includes a first and second targeting LEDs 64a, 64b. A printed circuit board assembly 60 which include a plurality of exposure illumination LEDs 66 and a polycarbonate lens array 62. The printed circuit board assembly 60 includes printed conductors and a power lead 112 operative for supplying power to the illumination LEDs 66. A suitable surface mount illumination LED is produced by the MarkTech Corporation of Latham, N.Y., as Part No. MTSM735K-UR or MTSM745KA-UR. Each illumination LED 66 provides illuminosity of 285 milli candela (mcd) over an angular illumination field of about 68 degrees. The small footprint of each illumination LED 66 enables four LEDs to be placed in a row measuring less than 14 mm. The printed circuit board assembly 60 includes four banks of four illumination LEDs 66 totalling sixteen illumination LEDs providing 4560 mcd of uniform illumination over the field of view 44.

The lens array 62 includes four illumination optic portions 88a, 88b, 88c, 88d each of which are aligned with a corresponding bank of illumination LEDs 66. The illumination optic portions 88a, 88b, 88c, 88d direct a 68 degree illumination from each illumination LED 66 into a uniform field having an angular field of view which substantially corresponds to the angular field of view of the optics assembly 17 which defines the target area 44 (shown in FIG. 5).

Referring to FIGS. 8 and 10 which show a horizontal cross section (FIG. 8) and a vertical cross section (FIG. 10) through the illumination optic portions 88a, 88b, 88c, 88d, it can be seen that each optic portion includes four vertically oriented cylindrical entry surfaces 116, one positioned in front of each LED 66 and a horizontally oriented exit surface positioned in front of each bank of LEDs 66. The vertically oriented cylindrical surfaces 116 define the horizontal field of illumination and the horizontally oriented cylinders 118 define the vertical field of illumination. This arrangement provides an even illumination intensity distribution across the target area 44. The 4560 mcd of illumination provided by the illumination LEDs 60 will provide an illumination intensity in excess of 106 lux at the far field cut off distance of 8.5 inches.

Referring again to FIG. 7, the targeting illuminators 64a, 64b, when energized, project illumination through apertures 68, 70 in the printed circuit board 60 and into first and second targeting optics 72, 74 respectively of the lens array 62. The targeting illuminators 64a, 64b are typical LED assemblies molded in an acrylic optic. The first targeting optics 72 shown in cross section in FIG. 9 includes an aspherical entry surface 76 and a horizontally positioned cylindrical exit surface 78. The aspherical entry surface has a radius of 4.97 mm and a conic constant of −8.8549. The cylindrical exit surface has a radius of 10 mm and is tipped at an angle "a" equal to 6.170 degrees from center.

Referring to FIG. 7 again, aspherical entry surface 76 and cylindrical exit surface 78 of the first targeting optics 72 interact to generate an illumination intensity distribution that appears to be a thin horizontal line 80 with a narrow height and a width approximately equal to the width of the target area 44. The tip angle "a" shifts the horizontal position of the line such that it is horizontally centered in the target area 44.

The second targeting optics 74, again shown in cross section in FIG. 9, includes an aspherical entry surface 84 and a vertically oriented cylindrical exit surface 86. The aspherical entry surface 84 has a radius of 4.5537 mm and a conic constant of −5.6710. The cylindrical exit surface 86 has a radius of 12.5 mm and is tipped at an angle "b" equal to 6.17 degrees from the center. Referring to FIG. 7 again, these surfaces interact to form an illumination intensity distribution that appears to be a thin vertical line 82 with a narrow width and a height approximately equal to the height of the target area 44. The combination of horizontal line 80 and vertical line 82 form a cross hair illumination intensity pattern to assist the operator in aiming the portable data collection device 10.

Figure 13A:
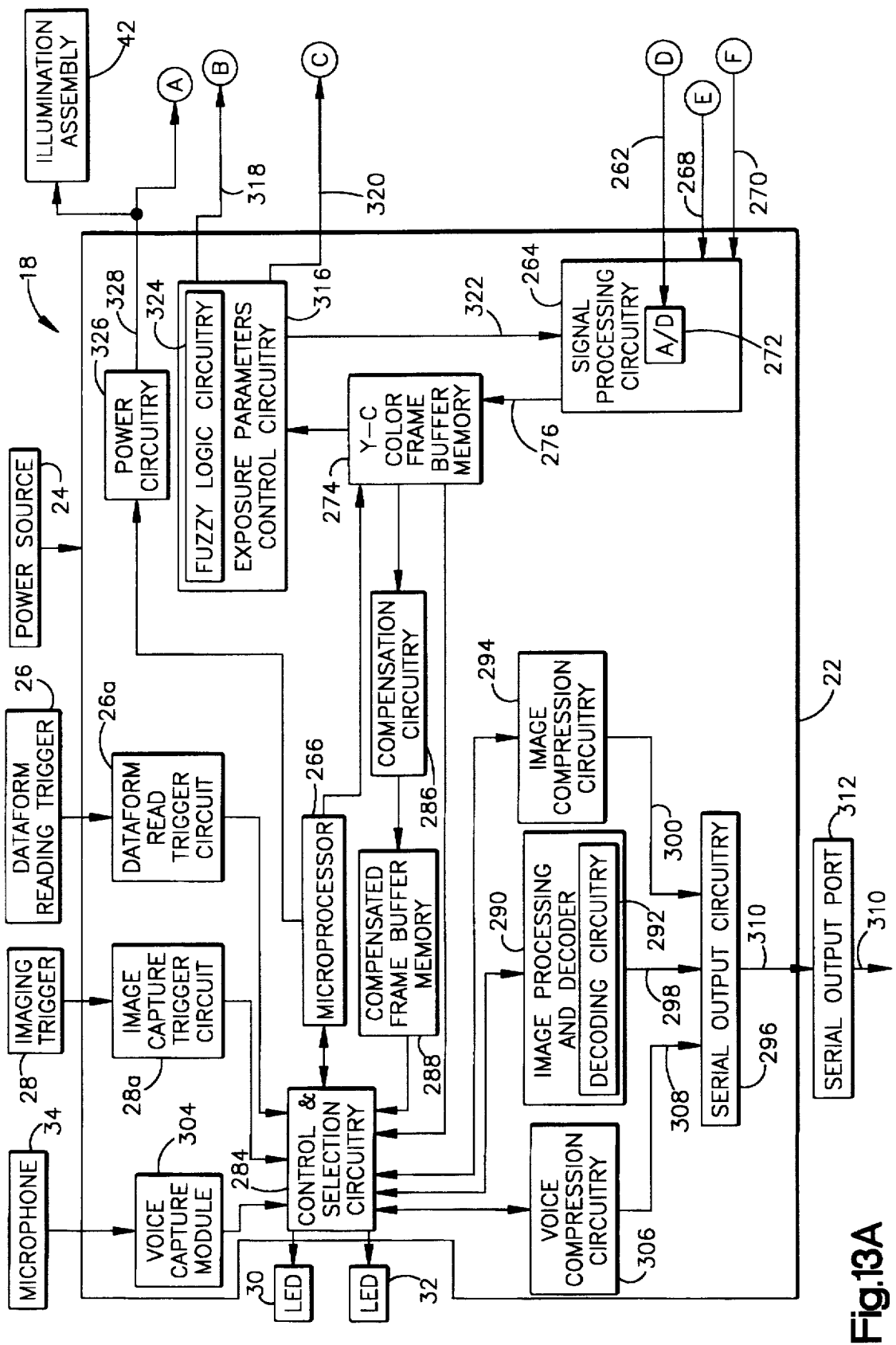
FIG. 13A is one portion of a block diagram of selected circuitry of the portable data collection device of the present invention.
Figure 13B:
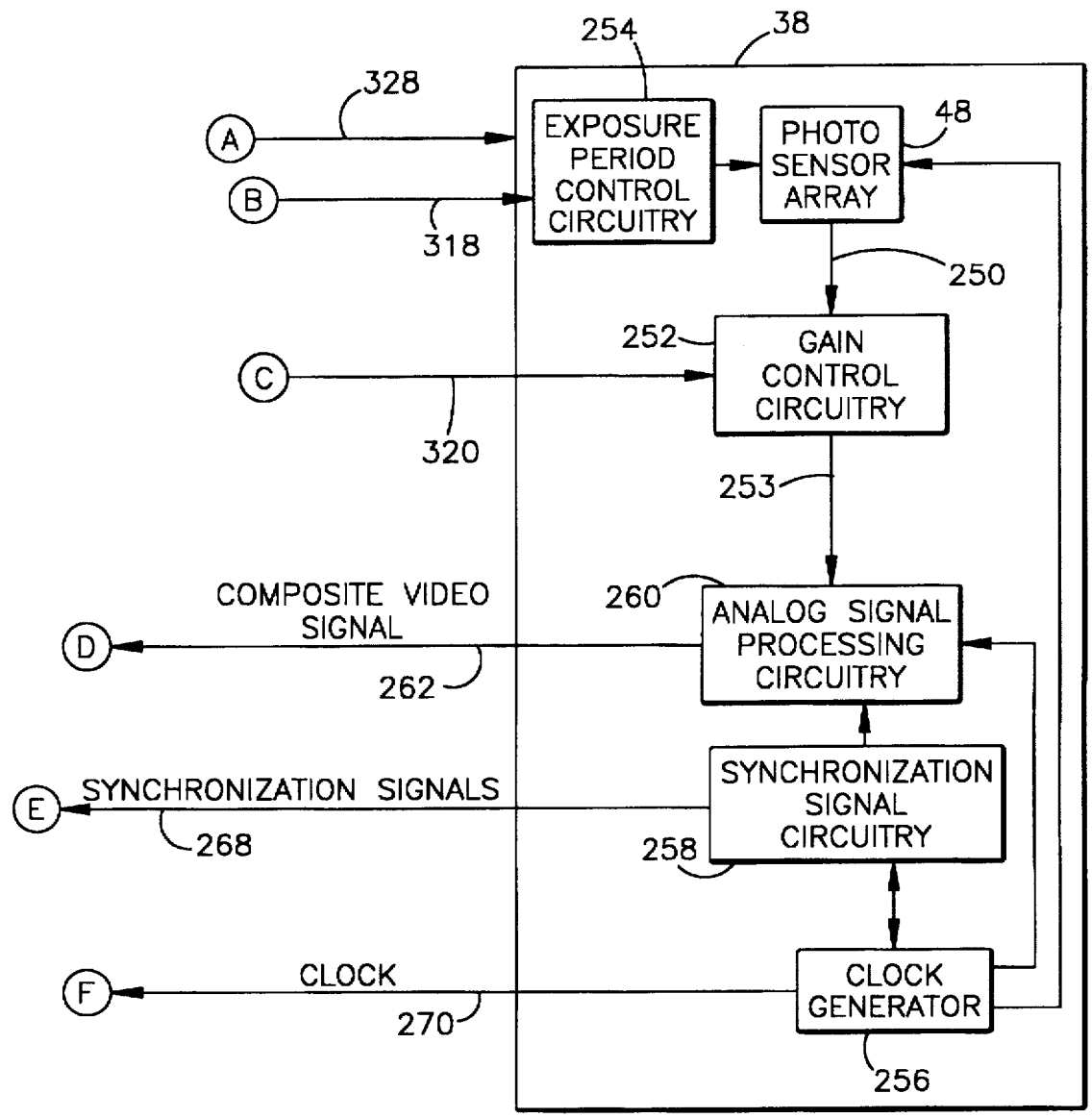
FIG. 13B is a second portion of a block diagram of selected circuitry of the portable data collection device of the present invention, the second portion matching the first portion shown in FIG. 13A.

In the preferred embodiment, the photosensor array assembly 48 is a PAL (phase alteration line) interlaced 752 by 582 pixel matrix charge coupled device (CCD) which, when read out generate s an interlaced video signal 250 (FIG. 13). This embodiment of the photosensor array assembly 48 will be referred to as the interlaced CCD embodiment of the photosensor array. Alternatively, the photosensor array assembly 48 could include a progressive scan CCD, a frame transfer CCD or an array of photodiodes and read out circuitry produced in accordance with U.S. Pat. No. 5,262, 861 to Wilder which includes read out circuitry capable of independently and selectively reading out individual or group of pixels.

When the imaging assembly 18 is actuated, the camera assembly 38 produces successive frames of an image of the target area 44. In the interlaced CCD embodiment of the 2D photosensor array assembly 48, the frames are composed of interlaced fields generated from reading out charges accumulated during an exposure period on the individual photosensors comprising the photosensor array 49. As c an be seen schematically in FIG. 13, a clock generator 256 provides clocking signals to the photosensor array assembly 48 to read out pixels and generate an interlaced video signal 250. The video signal 250 is amplified and filtered by gain control circuitry 252 of the camera assembly 38 resulting in a gain adjusted video signal 253.

Synchronization signals are generated by synchronization signal circuitry 258 to indicate which portions of the video signal 250 correspond to which photosensors or pixels of the photosensor array assembly 48. The synchronization signals along with standard black level signals are incorporated into the gain adjusted video signal 253 by analog signal processing circuitry 260 generating the PAL composite analog video signal 262 which is output to signal processing circuitry 264 on the control and decoder board 22. It should be appreciated that selection of another photosensor array will be similarly read out to generate a composite video signal. However, the format may be NTSC (National Television System Committee) standard if the selected array is NTSC or a noninterlaced format if a frame transfer or progressive scan CCD array is chosen.

In the preferred PAL embodiment, a read out of photosensors in the photosensor array assembly 48 generates a field of an image data representative of illumination incident on the array. Two interlaced fields (i.e., two read outs of the photosensor array assembly 48) comprise one full frame of an image of the target area 44. The camera assembly 38 generates consecutive fields of the image incident on the photosensor array assembly 48.

Under the control of a microprocessor 266 mounted on the control and decoder board 22, the analog video signal 262 is input to the signal processing circuitry 264 along with clocking signals 68 from the camera assembly clock generator 256 and synchronization signals 270 from the camera assembly synchronization signal circuitry 258. The signal processing circuitry 264 includes synchronization extractor circuitry which receives the clocking signals 268 and the synchronization signals 270 and generates signals which are coupled to an analog to digital converter (A/D converter) 272 causing the A/D converter to periodically digitize the composite analog video signal 262. The A/D converter 272 generates a series of 8 bit gray scale values, one gray scale value for each pixels of the photosensor array 48. The periodicity of the A/D converter 272 is based on a noncontinuous clock generated by the signal processing circuitry 264 and a portion of the signal corresponding to one frame is captured or stored in a color frame buffer memory 274.

A gray scale value for a photosensor or pixel is proportional to a voltage magnitude of the portion of the analog video signal 262 representative of that pixel. The voltage magnitude associated with a pixel, in turn, is proportional to an intensity of illumination incident on the pixel during the pixel's associated exposure period. Thus, gray scale value is a surrogate measure for intensity of illumination over the exposure period and the resulting charge stored on the photosensor. The signal processing circuitry 264 also generates address signals 276 coupled to the color frame buffer memory 274 to indicate a storage location for each digital gray scale value generated by the A/D converter 272.

It should be appreciated that if the chosen photosensor array assembly 48 is an NTSC or PAL interlaced array, the composite video signal can be tapped and displayed on an NTSC or PAL monitor. In the event the array is not NTSC or PAL, the imaging assembly 18 includes conversion circuitry such that an NTSC or PAL monitor may be connected to a video output port 76. The conversion circuitry includes a memory scanner/synchronization generator 278 which generates address signals for reading digital gray scale values out of the color frame buffer memory 274 and generates digital synchronization signals corresponding to PAL or NTSC format. A digital to analog converter 280 converts the series of gray scale values and digital synchronization values to an analog composite signal 28 corresponding to NTSC or PAL and coupling the analog signal output port 276.

Control and selection circuitry 284 mounted on the control and decoder board 22 and coupled to the color frame buffer memory 274 receives successive image frames temporarily stored in the frame buffer memory 274. Also coupled to the control and selection circuitry 284 are the dataform read trigger circuit 26a which, in turn, is coupled to the dataform reading trigger 26 and an image capture trigger circuit 28a which, in turn, is coupled to the imaging trigger 28.

When an operator institutes a dataform reading session (dataform reading mode) by depressing the dataform reading trigger 26, the dataform read trigger circuit 26a sends a signal to the control and selection circuitry 284 causing the control and selection circuitry to couple a captured frame from the color frame buffer memory 274 to compensation circuitry 286. The compensation circuitry 286 compensates for the differential in gray scale values resulting from transmitting differences between each of the green, blue or red portions of the color RBG filter 50 over the photosensor array 49. The RBG filter 50 provides for a green filter portion to overly 50% of the pixels and each of the blue and red filter portion to overlay 25% of the pixels. The compensated gray scale values for a captured image frame are shifted into a compensated frame buffer memory 288. The compensation circuitry 286 may compensate using any one of three algorithms. The algorithms are: 1) ignore the gray scale values corresponding to red and blue pixels and only select gray scale values corresponding to green pixels; 2) adjust the gray scale value for each red and blue overlied pixel to a gray scale value that pixel would have generated had it had a green filter overlying it; and 3) locate the dataform in the image area and perform the compensation discussed in algorithm (2) only on those in a portion of the photosensor array 39 where the dataform is imaged. Compensating the gray scale values of pixels with a red or blue overlying filter may be accomplished as follows: the gray scale values of each pixel with an overlying green filter may be averaged to generate a green-average gray scale value. The gray scale values of each pixel with a red overlying filter may be averaged to generate a red-average gray scale value and the gray scale values of each pixel with a blue overlying filter may be averaged to generate a blue-average gray scale value. Based on the difference between green-average and red-average, gray scale values of each red overlied pixel may be adjusted such that the average would equal the green-average value. Each blue overlied pixel may be adjusted based on the difference between blue-average and green-average similarly.

While this compensation method will work, the presence of colored background clutter within the field of view around the dataform will distract compensation within the dataform area. Therefore, the third method contemplates locating the dataform area and performing the averaging based compensation only within the dataform area.

The gray scale values stored in the compensated frame buffer memory are then decoded by image processing circuitry 290 which includes decoding circuitry 292 for decoding a dataform represented in the captured frame. The decoding circuitry 292 includes a decoder for decoding 1D and 2D dataforms in the target area 44. The decoding circuitry 292 operates on the stored frame of image data to extract dataform cell data (determine the black or white value of each cell of the dataform) and decode the cell data. Cell extraction is done in accordance with U.S. patent application Ser. No. 08/543,122 entitled, "Sub Pixel Dataform Reader With Dynamic Noise Margins", filed Oct. 13, 1995, and assigned to the assignee of the present invention. The contents of application Ser. No. 08/543,122 is hereby incorporated by reference. Decoding of the cell data is accomplished by known decoding methods for each particular dataform format.

Also coupled to the control and selection circuitry 284 is image compression circuitry 294 and serial output circuitry 296. The control and selection circuitry 284 routes data 298 representing a decoded dataform data directly from the decoding circuitry 292 to the serial output circuitry 296. The decoded dataform data 298 is not compressed prior to output to the serial output circuitry 296. There is a possibility of error in the compression and subsequent decompression process and losing even a portion of a decoded dataform data may result in adverse consequences such as subsequent errors in updating inventory, determining the status or tracking an item, etc. Thus, the decoded dataform data 298 is not compressed.

When an operator institutes an imaging session (imaging mode) by depressing the imaging trigger 28, the image capture trigger circuit 28a sends a signal to the control and selection circuitry 284 causing the selection circuitry to couple a captured frame from the color frame buffer memory 274 to the image processing circuitry 290. The control and selection circuitry 284 will determine whether data representing the captured frame will be routed to image compression circuitry 294 to be compressed before being output to the serial output circuitry 296 or whether the image data representing the captured frame will be routed directly to the serial output circuitry 296 without being compressed.

Generally, the control and selection circuitry 284 will be programmed to route the data representing a captured image frame to the image compression circuitry 294 because the occurrence of one or more errors in the data representing an image is normally not a significant problem. That is, an image of an item in the target area 44 will still be recognizable and useful to supervisory personnel viewing the image reconstructed from the captured image frame data even if there is some slight distortion of the image. After compression of the image data by the image compression circuitry 294, compressed image data 300 is routed to the serial output circuitry 296. If, however, a high resolution image is needed, the control and selection circuitry 284 may be appropriately programmed to route the data representing the captured frame directly to the serial output circuitry 296.

The image compression circuitry 294 utilizes an image compression algorithm to reduce the size of a set of digital image data. One such algorithm is the 2D wavelet transform compression algorithm as described in "A 64 Kb/s Video Code Using the 2D Wavelet Transform" by A. S. Lewis and G. Knowles, published in IEEE Computer Society Press, Order No. 2202. The HARC Wavelet Transform System utilizing such technology is available from Houston Advance Research Center in Houston, Tex. and is capable of compressing photographic data with an image compression ratio of up to 400:1.

Because the portable data collection device 10 is adapted for use in remote on-site locations for reading a dataform identifying a particular item or capturing an image of an item, it is desirable to enable the imaging assembly 18 to also capture a verbal message from the operator. The control and decoder board 22 also includes a voice capture module 304 for capturing and digitizing an operator's verbal message and voice compression circuitry 306 for compressing the captured verbal message. The voice capture module 304 is coupled to the microphone 34 and is operable by the control and selection circuitry 284 to capture and digitize audio input. The voice compression circuitry 306 compresses a digitized voice signal. Data 308 representing the compressed digitized voice signal is coupled to the serial output circuitry 296.

For a predetermined period of time after either the dataform reading trigger 36 is depressed to initiate a dataform reading session (dataform reading mode) or the imaging trigger 28 is depressed to initiate a image capture session (imaging mode), the control and selection circuitry 284 monitors the image capture trigger switch 28. If the operator depresses the trigger 28 during the predetermined period, the voice capture module 304 and voice compression circuitry 306 are activated for verbal input. As long as the operator keeps the trigger depressed, the voice capture module 304 and voice compression circuitry 306 will remain activated so that the operator can speak into the microphone 34 and provide information concerning an item whose image was captured or whose dataform was read which will be transmitted and/or stored with the corresponding image or decoded dataform. Normally, the voice capture module 304 will be used subsequent to an imaging session where the operator wants to communicate to supervisory personnel reviewing the captured image some additional information concerning the imaged item such as the item's location, a short description of the problem with the item, etc. The voice compression circuitry 306 utilizes one of a number voice compression algorithms well known to those skilled in the art.

Decoded dataform data 298, compressed image data 300 and compressed digitized voice data 308 are routed to the serial output circuitry 296 which assembles output data 310 for serial output through a serial output port 312. In portable data collection device 10 of the present embodiment (FIGS. 1–4) the serial output port 312 is coupled to an input port of a radio module 314 mounted on the control and decoder board 22 (shown schematically in FIG. 11). The radio module 314 modulates and transmits the output data 310 to a remote device (not shown) where the transmitted data is demodulated. The demodulated output data may be used to update inventory, and/or accounting records, update production control expediting or product tracking files, permit supervisory corrective action to remove/repair damaged items, etc.

The control and decoder board 22 further includes exposure parameters control circuitry 316 which outputs control signals 318, 320 to the exposure period control circuitry 254 and the gain control circuitry 252 of the camera assembly 38 and a signal 322 embodying an appropriate set of reference voltages for operating the A/D converter 272. The exposure parameters control circuitry 316 includes fuzzy logic circuitry 324 which analyzes captured frames of data accessed from the frame buffer memory 274. The fuzzy logic circuitry 324 analyzes a captured frame to determines if the current exposure period of the 2D photosensor array 48, the current amplification of the video signal 250 by the gain control circuitry 252 and the reference voltages used by the A/D converter 272 are resulting in an "acceptable" captured image frame. If not, the control signal 318 is changed to adjust the exposure period of the 2D photosensor array 48 and/or the control signal 320 is changed to adjust the amplification of the video signal 250 and/or the signal 322 is changed to adjust the operation of the A/D converter 272. After the adjustment, another captured frame is analyzed by the fuzzy logic circuitry 324 and, if necessary, further adjustments are made in an iterative fashion until the camera assembly 32 produces an "acceptable" captured image. A suitable exposure parameter control circuit including fuzzy logic control circuitry is disclosed in U.S. application Ser. No. 08/544,618, filed Oct. 18, 1995, entitled "Extended Working Range Dataform Reader Including Fuzzy Logic Image Control Circuitry." The contents of U.S. application Ser. No. 08/544,618 are incorporated in its entirety by reference.

As can be seen in FIGS. 4 and 13, the power source 24 is coupled to the control and decoder board 22 to provide operating power to the microprocessor 266 and other circuitry mounted on the board and the radio module 314. Power circuitry 326 under the control of the microprocessor 266 is coupled through a lead 328 to the illumination assembly 42 and the camera assembly 38 to supply power to these components of the imaging assembly 18.

Figure 14:
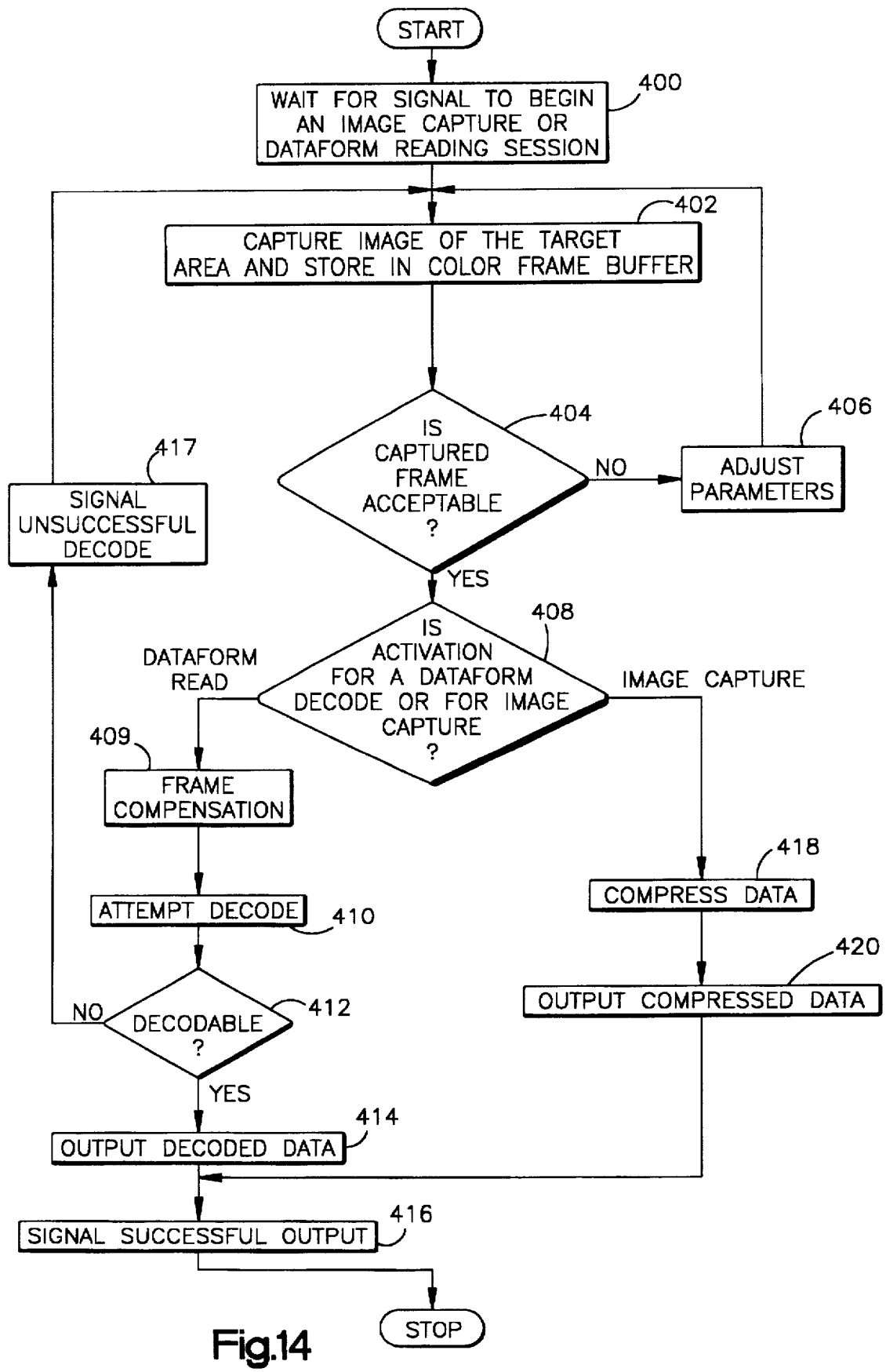
FIG. 14 is a flow chart setting forth one operating embodiment of the portable data collection device of the present invention to decode a bar code dataform and capture an image of a target area.
Figure 15:
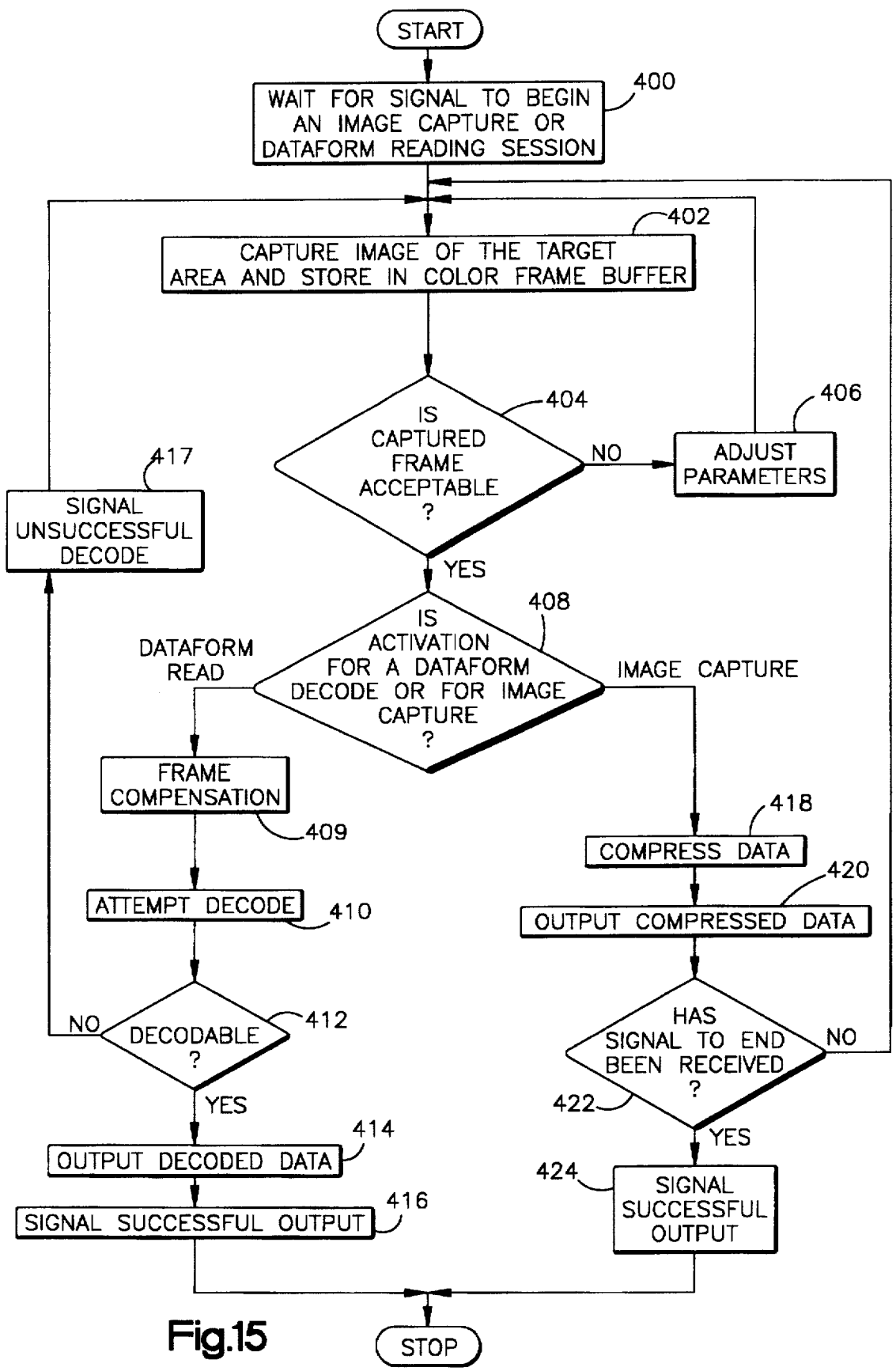
FIG. 15 is a flow chart setting forth a second operating embodiment of the portable data collection device of the present invention to decode a bar code dataform and capture an image of a target area.
Figure 16:
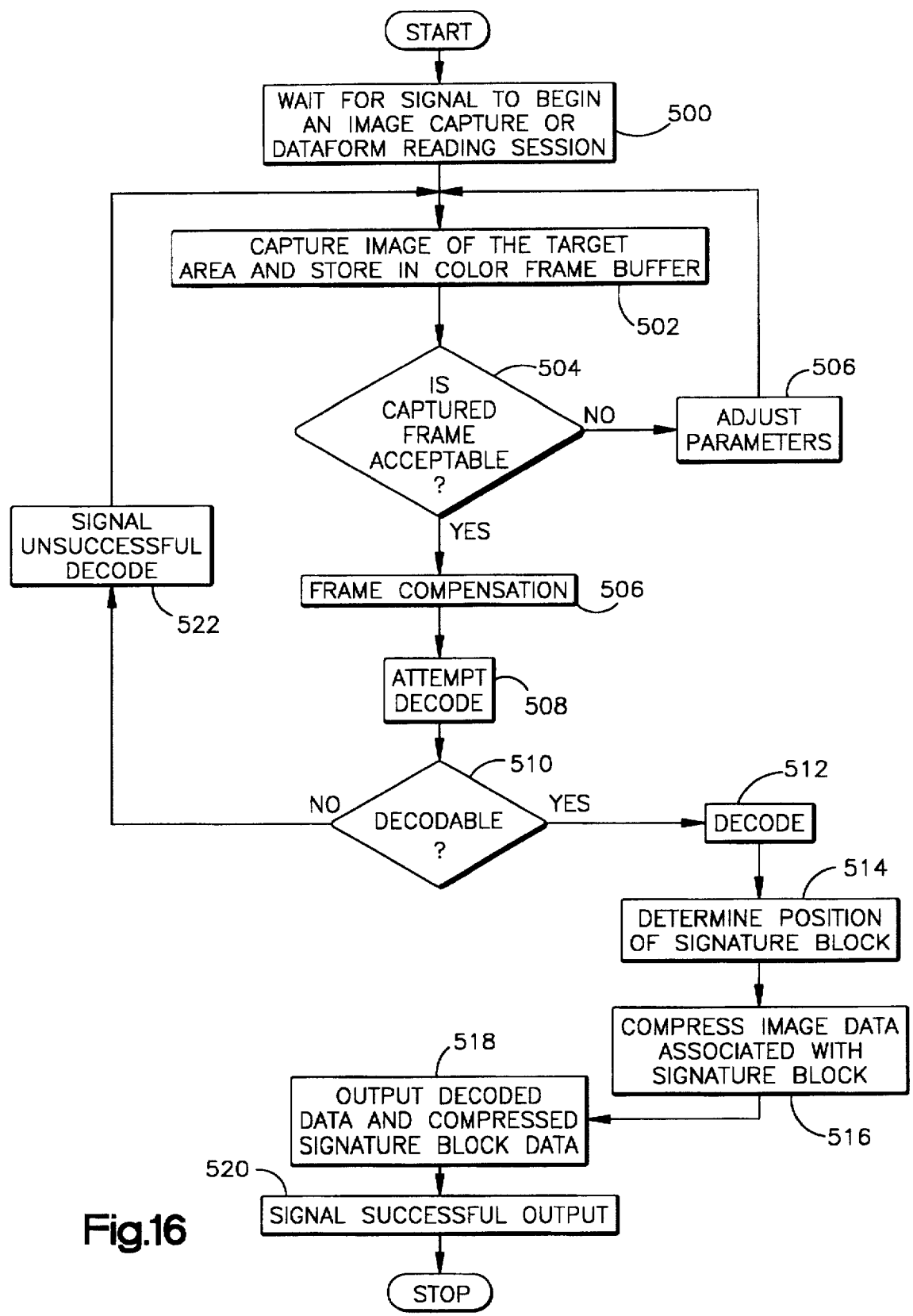
FIG. 16 is a flowchart setting forth a third operating embodiment of the portable data collection device of the present invention wherein a captured image frame includes a dataform and a signature block as shown in FIG. 12 and in which decoded dataform data and a portion of the capture image are output.

The flow chart shown in FIG. 14 illustrates the operation of the imaging assembly 18 in the dataform decoding mode and a first operating embodiment of the imaging mode. In the first operating embodiment of the imaging mode, a single frame of the image in the target area 44 is captured, compressed and output when the operator depressed the imaging trigger 28. The flow chart shown in FIG. 15 illustrates the operation of the imaging assembly 18 in the dataform decoding mode and a second operating embodiment of the imaging mode. In the second operating embodiment of the imaging mode, successive frames of the image in the target area 44 are captured, compressed and output as long as the operator has the imaging trigger 28 depressed. The flowchart in FIG. 16 illustrates a third operating embodiment in which the imaging assembly is actuated in the dataform reading mode and to decode a dataform within the image area and to capture the digital image dataform selected image area such as a signature box. The imaging system 18 determines a position of the dataform in the target area and then determines the position of the signature box. The digital image data corresponding to the portion of the image area including the signature box is output in either compressed or noncompressed form through the serial output port 312.

The imaging mode is advantageously employed when the operator using the portable data collection device 10 notices the item 46 is damaged, out of place, incomplete, etc. The imaging mode of the imaging assembly 18 is used to capture an image of the item 46 and, using the radio module 314, transmit the captured image to a remote device accessible by supervisory personnel so that the problem may be ascertained by supervisory personnel and appropriate corrective action taken, e.g., deletion of item from inventory records, issuance of order to remove item from storage location and return to production facility or vendor for rework/repair, moving item to proper location, filing insurance claim, etc.

Turning to the first operating embodiment of the imaging mode shown in FIG. 14, at 400 the imaging assembly 18 waits for a signal representing either actuation of the imaging trigger 28 or the dataform reading trigger 26 to commence either an image capture session or a dataform reading session. The signal may be generated by the image capture trigger circuit 28a, the dataform reading trigger circuit 26a or by a signal generated by customer specific application software. At 402, upon receiving an appropriate signal, the imaging assembly 18 is activated and a frame of image data captured and stored in the color frame buffer memory 274.

At 404, the fuzzy logic circuitry 324 determines if the captured image frame is acceptable, that is, the image is within predetermined acceptable ranges for brightness and the magnitude of charges on the photosensors of the 2D photosensor array 48. If the fuzzy logic circuitry 324 determines the captured frame is not acceptable, one or more of the operating parameters of the camera assembly 38 and the A/D converter 272 are modified as shown at step 406. The loop represented by steps 402, 404, 406 are repeated until the captured frame is determined to be acceptable.

At step 408, if the control and selection circuitry 284 determines that the activation signal is from the dataform reading trigger 26 requiring a dataform decode, the captured frame is coupled to the frame compensation circuitry 286. At step 409, a compensation algorithm is executed on the captured frame by the compensation circuitry 286 to compensate for the gray scale value changes resulting from the reflected light from the target dataform passing through the RGB filter 50 overlying the photosensor array 49. After the captured frame gray scale values have been suitably adjusted by the compensated circuitry 286, the gray scale values are coupled to the decoding circuitry 292 for attempted decoded of the dataform represented in the captured frame. At step 410, the decoding circuitry 292 attempts to decode the dataform represented in the captured frame. At step 412, a determination is made if the decoding was successful. At step 414, if the decoding was successful, the extracted decoded data is output to the serial output circuitry 296 and at step 416, the green LED indicator 32 is energized for a predetermined time to signal the operator that the dataform 45 in the target area 44 has been successfully read. Subsequently, the imaging assembly 18 is turned off.

If at step 412, the decoding was not successful, the selection circuitry at energizes the red LED indicator 30 for a predetermined time to signal to the operator that the decoding was unsuccessful and that he or she should continue to point the device 10 at the dataform 45 in the target area 44. The process returns to step 402 where another image frame is capture and the remaining steps are repeated.

If at step 408, the control and selection circuitry 284 determines that the activation signal is from the imaging trigger 28, the captured frame is routed to image compression circuitry 294 to compress the data in the captured frame, shown at step 418. At step 420, the compressed image data is output to the serial output circuitry 296 and the green LED indicator 32 is energized to signal the operator that the image in the target area 44 has been successfully captured.

Referring to FIG. 15, in a second operating embodiment of the imaging mode, successive frames of an image of the target area 44 are captured for as long as the operator maintains the imaging trigger 28 depressed. This operating embodiment would be advantageous in situations where the item 46 which the operator wishes to image because of some defect, damage, etc., is very large compared to the area of the target area 44. Therefore, capturing a single image frame and transmitting a signal corresponding to the captured frame to a remote device or supervisory review may not provide supervisory personnel with an image covering a large enough portion of the item 46 to ascertain the problem and determine appropriate corrective action. By capturing successive frames during the period that the operator keeps the imaging trigger 28 depressed, the operator may move the portable data collection device 10 with respect to the item 46 to provide a video image of the complete item (or an image of as much of the item as necessary to provide for identification of the item and the item's problem).

For this embodiment, the process remains generally the same as the embodiment described in connection with FIG. 14. However, after the output of compressed data to the serial output circuitry 296 at step 420, the control and selection circuitry 284, at step 422, checks to see if a signal has been received from the image capture trigger circuitry 28a indicating that the operator has released the imaging trigger 28. If such a signal from the image capture trigger circuitry 28a has been received, then at 424, the control and selection circuitry 284 energizes the green LED indicator 32 for a predetermined time period to signal the operator that the image in the target area 44 has been successfully captured. Subsequently, the imaging assembly 18 is turned off.

If no signal is received from the image capture trigger circuitry 28a indicating that the operator has released the imaging trigger 28, then the process loops back to step 402 and successive image frames are captured, compressed and output to the serial output circuitry 296 until such time as the control and selection circuitry 284 received the signal from the image capture trigger circuitry 28a indicating that the imaging trigger 28 has been released.

As can best be seen in FIGS. 11 and 13, the imaging assembly 18 includes the camera assembly 38 which is electrically coupled to the control and decoder board 22. The control and decoder board 22 includes the microprocessor 266 and associated circuitry. The circuitry of the imaging assembly 18 may by embodied in software resident in one or more RAM or ROM memory chips 430 (FIG. 4) mounted on the control and decoder board 22 and operated by the microprocessor 266. Alternately, the circuitry of the imaging assembly 18 may comprise separate application-specific integrated circuitry (ASIC) mounted on the control and decoder board 22.

Figure 12:
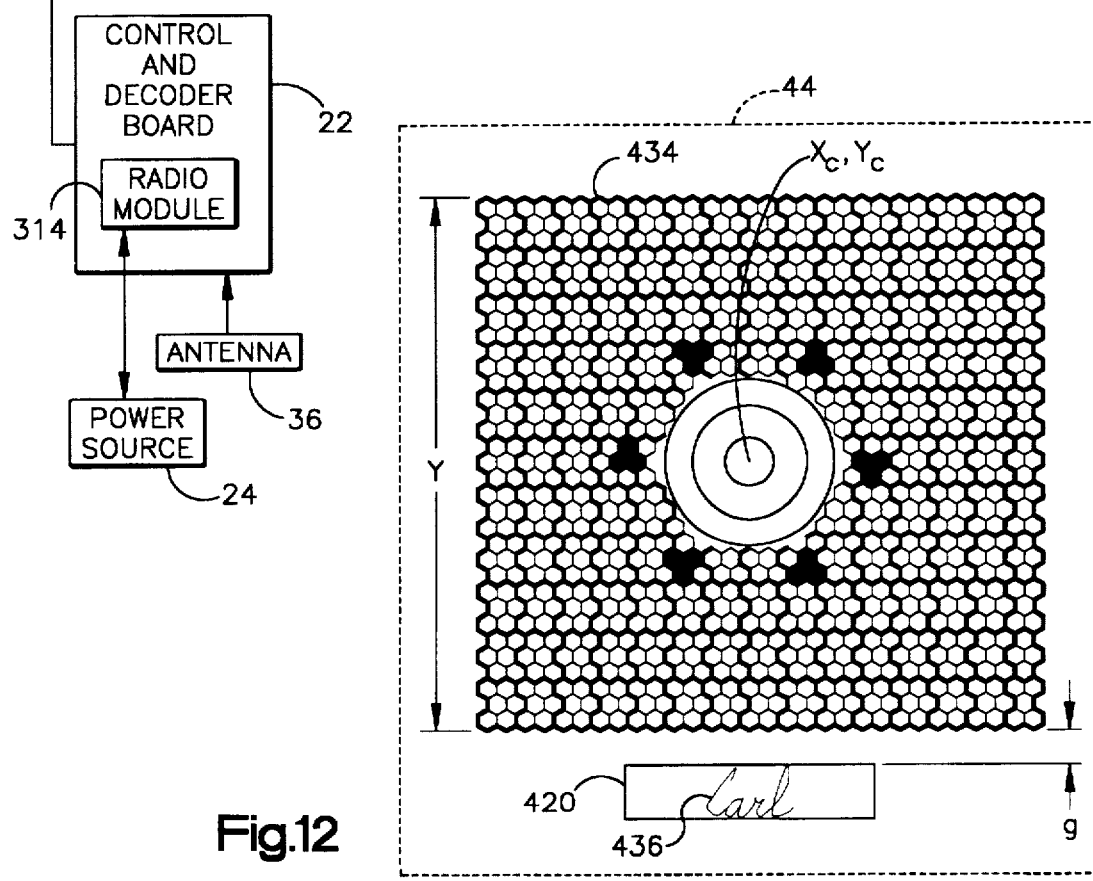
FIG. 12 is a representation of a matrix dataform and an associated signature block.

In the third operating embodiment of the portable data collection device 10 of the present invention, the dataform decoding mode is actuated to capture, compress and output an image contained within the boundary of an image area associated with a dataform. For example, the desired image area may be a signature block positioned a predetermined distance from a dataform. In FIG. 12, a signature block 432 is associated with a 2D dataform 434 known as MaxiCode (MaxiCode™ is a symbology standard of United Parcel Service). The signature block 420 is positioned at a predetermined location with respect to the dataform 434.

The dataform 434 is imprinted on a label affixed to a package to be delivered to a recipient. When the package is delivered, the recipient signs his or her signature 436 within a perimeter of the signature block 420. To document delivery of the package, the portable data collection device imaging assembly 18 is actuated with the dataform reading trigger 28 to image and decode the dataform 434. However, in addition to decoding the dataform 434, it would be desirable to store a portion of the captured image corresponding to the image within the signature block 320 to prove the recipient's acknowledgement of receipt of the package.

In the third operating embodiment, the imaging assembly 18 will capture an image of the target area 44 including both the dataform 434 and the signature block 420. The output data sent to the serial output circuitry 296 will include the decoded dataform and a compressed digital image of the image within the signature block 420, i.e., the signature 436.

FIG. 16 is a flowchart summarizing this third operating embodiment. At step 500, the imaging assembly 18 waits for the start of a dataform read session which is typically initiated by the operator pulling the dataform reading trigger switch 26. After imaging the target area 44, at step 502, a frame of an image of the target area 44 is captured and a digital representation is stored in the color frame buffer memory 274. The fuzzy logic control circuitry 324 determines if the captured image frame is acceptable for decoding at step 504. If the frame is not acceptable, parameters are adjusted at step 506.

If the captured image frame is acceptable for decoding at step 506, the frame compensation circuitry 286, using one of the compensation algorithms described above, compensates for the changes in magnitude of the gray scale values resulting from reflected illumination from the target area 44 passing through the RGB filter 50. At step 508, the decoding circuitry 292 attempts to decode cell values associated with compensated gray scale values stored in the compensated frame buffer memory 288. At step 510, if the compensated gray scale values are decodeable, then, at step 512, decode of the dataform 434 occurs. The signature block 420 is located at a predetermined position with respect to the dataform 434, that is, the location, size and/or orientation of the signature block 420 with respect to the dataform 434 is fixed. Data representative of the predetermined position may be encoded in the dataform or may be preprogrammed into the portable data collection device's application software. Also included in the dataform are certain distinguishing features that permit locating the dataform 434 in the target area, for example, the bulls eye" mark at the MaxiCode center. Other dataform formats would include different distinguishing features such a guard bar for PDF417 or Super Code dataforms or orientation markers for data matrix dataforms. As a result of the predetermined position data in conjunction with the distinguishing features of the dataform, the location, size and/or orientation of the signature block 420 within the target area 44 is determined at step 514, is determined. At step 516, a digital representation of the portion of the image corresponding to the signature block 420 is coupled to the image compression circuitry 294 for data compression.

The compressed image data representing the signature block 420 and at least a portion of the decoded dataform data are output to the serial output circuitry 296, at step 518, for subsequent transmission by the radio module 314 to a remote device. At step 520, the green LED 32 is energized for a predetermined time signaling to the operator that the dataform 434 was successfully decoded and an image of the signature block 420 was successfully captured and output, to the serial output circuitry 296. If the captured frame is not decodable at step 510, the red LED 30 is energized for a predetermined time to inform the operator that the read was unsuccessful and to maintain the dataform reading trigger 26 depressed and keep the data collection device 10 aimed at the dataform 434 until a successful read is obtained.

It should be appreciated that because the predetermined positional data for a desired image area such as a signature block located at a predetermined position with respect to a dataform may be preprogrammed into the portable data collection device, digital image data of a portion of the desired image area may be output without the necessity of decoding the dataform. After storing a digital representation of the target area 44 and locating the distinguishing features of the dataform 434, the location of the signature block 420 can be calculated based on the pre-programmed predetermined position data and the location of the distinguishing features of the dataform.

Regardless of whether predetermined positional data is preprogrammed into the data collection device 10 or encoded in the dataform. There will be uses for the device 10 this invention wherein only some of the codes will have associated desired image areas. Therefore, it is desirable for a dataform to include an indication as to whether there exists an associated desired image area to be captured and output.

The indication may be encoded in the dataform or the dataform format itself may be the indication. For example, all MaxiCode formats may be known to have an associated desired image area which is to be captured and output.

In the signature block placement of FIG. 12, the block is centered below the dataform 434 at a distance "g" from the dataform. The height of the block is H and the width is W. The dataform is of a predetermined size having a height "Y". To locate the signature block 420 in the target field 44, coordinate locations of the center ($x_c, y_c$) and the height of the dataform "Y" are determined in the pixel coordinate domain. Then, the formulas for calculating the positions of the four corners of the signature box in the pixel coordinate domain are as follows:

Upper-left corner: $(x_l-x_c, y_u-y_c)=(-W/2, Y/2+g)$

Upper-right corner: $(x_r-x_c, y_u-y_c)=(W/2, Y/2+g)$

Lower-left corner: $(x_l-x_c, y_l-y_c)=(-W/2, Y/2+g+H)$

Lower-right corner: $(x_r-x_c, y_l-y_c)=(W/2, Y/2+g+H)$

The formulas to correct each x or y value for angular rotation θ is as follows:

$(x')=(\cos\theta-\sin\theta)(x-x_c)+(x_c)$ $(y')=(\sin\theta-\cos\theta)(y-y_c)+(y_c)$ An alternate embodiment of the portable data collection device of the present invention is shown in FIGS. 17–20. Similar reference numbers will be used to describe this embodiment as were used in the embodiment shown in FIGS. 1–4. A portable data collection device including a workslate computer is shown generally as 10' in FIGS. 17–20. The data collection device 10' includes a housing 12' defining an interior region. The housing 12' includes an upper surface 12a' and a lower surface 12b' separated by a side wall 12c'. A portion 12d of the lower surface 12b' is bowed outwardly to provide additional space in the interior region. A side wall 12e' of the bowed portion 12d includes an opening through which a portion of an optics assembly 43' and a portion of an illumination assembly 42' extend.

The optic assembly 43' and the illumination assembly 42' are components of the modular portion 20' of a two dimensional (2D) imaging assembly 18'. The upper surface 12a' includes an opening through which a touch sensitive display screen 13' is visible which can be used to view output data and graphic displays as well as input data and commands to a microprocessor in the interior region which controls functioning of the device 10'. Input of data and commands to the microprocessor may also be accomplished through a keypad 15' having a plurality of keys which are supported on the upper surface 12a'.

A dataform reading trigger or actuator 26' extends through an opening in the upper and side surfaces 12a', 12c'. On an opposite side of the display screen 13' is an imaging trigger or actuator 28' extends through an opening in the upper and side surfaces 12a', 12c'.

The upper surface 12a' includes two small openings through which a distal portion of a red light emitting diode (LED) indicator 30' and a distal portion of a green LED indicator 32' extend. Finally, the upper surface 12a' of the housing 12' includes an opening exposing a portion of a microphone 34' mounted in the housing interior region. The interior region of the housing 12' supports the imaging assembly 18' and other electronic circuitry. In both embodiments of the portable data collection device 10, 10', the imaging assembly 18, 18' and associated circuitry are identical and it should be understood that descriptions thereof apply equally to both embodiments. A major distinction between the two embodiments is that the serial digital output data 310 is coupled to an input port of a terminal processing board (not shown) within the workslate. The processing board may further process the data 310 and store the resulting processed data. After completing a work shift, an operator may drop of the device 10' where the processed data will be downloaded from the processing board memory for updating records and/or analysis of stored image representations. Alternatively, the workslate may include a radio for telemetering data to a remote location.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

We claim:

1. A portable data collection device, comprising:

a) a camera assembly, including an array of photosensor elements generating a signal representative of an image of a generally rectangular target area of the device, b) an optics assembly positioned to focus illumination reflected from the generally rectangular target area onto said photosensor elements, the target area having a height and a width, c) image processing and decoder circuitry receiving said signal and generating decoded data representative of the dataform, and d) an illumination assembly directing illumination towards the target area, the illumination assembly including a lens array with a cylindrical optic entry surface with an entry longitudinal axis and a cylindrical optic exit surface with an exit longitudinal axis, the entry longitudinal axis being orientated substantially orthogonal to the exit longitudinal axis.

2. The device of claim 1 wherein at least one of the cylindrical optic entry surface and the cylindrical optic exit surface defines an illumination intensity distribution that is substantially even across the width of the target area.

3. The device of claim 2 wherein the other of the entry surface and the exit surface defines an illumination intensity distribution that is substantially even across the height of the target area.

4. The device of claim 3 wherein the entry longitudinal axis is substantially aligned along the height dimension of the target area and defines the illumination intensity distribution over the width of the target area, and wherein the exit longitudinal axis is substantially aligned along the width dimension of the target area and defines the illumination intensity distribution over the height of the target area.

5. The device of claim 3 wherein the illumination assembly includes a plurality of cylindrical optic entry surfaces and a common cylindrical optic exit surface optically associated with the plurality of entry surfaces, and a plurality of light emitting diodes, each diode positioned to project illumination through a selected one of the optic entry surfaces and the common optic exit surface.

6. The device of claim 5 wherein the illumination assembly includes sixteen cylindrical optic entry surfaces positioned in four rows of four surfaces each with four common cylindrical optic exit surfaces, each exit surface extending across one of the four rows, and sixteen light emitting diodes, each positioned to project illumination through a selected on of the entry surfaces and the associated common exit surface.

7. The device of claim 1, wherein the illumination assembly includes a plurality of surface mount LEDs mounted on a board and illumination through the lens array towards the target area.

8. A portable data collection device comprising:
  a) a camera assembly, including an array of photosensor elements generating a signal representative of an image of a target area,
  b) an optics assembly positioned to focus illumination reflected from a generally rectangular target area onto said photosensor elements, the target area having a height and a width,
  c) image processing and decoder circuitry receiving said signal and generating decoded data representative of the dataform, and
  d) an illumination assembly directing illumination towards the target area, the illumination assembly including a targeting arrangement for directing an illumination intensity distribution resembling a cross hair pattern toward the target area to aid in aiming the portable data collection device, the crosshair pattern being stationary with respect to the target area.

9. A portable data collection device comprising:
  a) a camera assembly, including an array of photosensor elements generating a signal representative of an image of a generally rectangular target area of the assembly,
  b) an optics assembly positioned to focus illumination reflected from the generally rectangular target area onto said photosensor elements, the target area having a height and a width,
  c) image processing and decoder circuitry receiving said signal and generating decoded data representative of the dataform, and
  d) an illumination assembly directing illumination towards the target area, the illumination assembly including a targeting arrangement for directing an illumination intensity distribution resembling a cross hair pattern to aid in aiming the portable data collection device, the cross hair pattern including a horizontal line with a width substantially corresponding to the width of the target area and a vertical line with a height substantially corresponding to the height of the target area.

10. The device of claim 9, wherein the targeting arrangement includes a horizontal line illumination generating arrangement including a lens element with an optic entry surface and a cylindrical optic exit surface, the entry surface and the exit surface defining a thin horizontal illumination intensity distribution pattern extending approximately the width of the target area.

11. The device of claim 10, wherein the horizontal line illumination generating arrangement is positioned to the side of the camera assembly and the exit surface is tipped with respect to the entry surface such that the horizontal illumination intensity distribution pattern is approximately centered within the field of view of the camera assembly.

12. The device of claim 10, wherein the targeting arrangement further includes a vertical line illumination generating arrangement including a lens element with an optic entry surface and a cylindrical, optic exit surface, the entry surface and the exit surface defining a thin vertical illumination intensity distribution pattern extending approximately the height of the target area.

13. The device of claim 12, wherein the horizontal line illumination generating arrangement is positioned to one side of the camera assembly and the vertical line illumination generating arrangement is positioned to an opposite side of the camera assembly and the horizontal line illumination generating exit surface is tipped with respect to the entry surface such that the horizontal illumination intensity distribution pattern is approximately centered within the field of view of the camera assembly and the vertical line illumination generating exit surface is tipped with respect to the entry surface such that the vertical illumination intensity distribution pattern is approximately centered within the field of view of the camera assembly.

14. The device of claims 10, 11, 12, or 13 wherein at least one of the horizontal line illumination generating arrangement entry surface and the vertical line illumination generating arrangement entry surface is an aspherical surface.

15. A portable data collection device for reading a dataform positioned in a target area of the device, the device comprising:
  a) a housing forming an interior region,
  b) an imaging assembly at least partially enclosed in the interior region, for capturing an image of the dataform and providing decoded data representative of the dataform in the target area,
  c) a user activated actuator at least partially exposed on the exterior of the housing for actuating the imaging assembly to read a dataform, and
  d) the imaging assembly including a modular housing supporting a camera assembly with a field of view corresponding to the target area and further supporting an illumination assembly directing exposure illumination towards the target area, the illumination assembly including targeting optics for directing targeting illumination towards the target area for aiding in aiming the device at the dataform, the targeting illumination includes at least one thin illumination intensity distribution pattern that is stationary with respect to the target area of the device and extends between two sides of the target area.

16. A portable data collection device for reading a dataform positioned in a target area of the device, the device comprising:
  a) a housing forming an interior region,
  b) an imaging assembly at least partially enclosed in the interior region, for capturing an image of the dataform and providing decoded data representative of the dataform in the target area,
  c) a user activated actuator at least partially exposed on the exterior of the housing for actuating the imaging assembly to read a dataform, and
  d) the imaging assembly including a modular housing supporting a camera assembly with a field of view corresponding to the target area and further supporting an illumination assembly directing exposure illumination towards the target area and targeting illumination towards the target area for aiding in aiming the device, the modular housing having a camera support surface for positioning the camera assembly with respect to the housing and an illumination assembly support surface for positioning the illumination assembly at a fixed position with respect to the camera such that a field of illumination substantially coincides with the field of view of the camera assembly.

17. The device of claim 16 wherein the illumination assembly includes a targeting illumination arrangement generating a targeting illumination intensity distribution pattern forming a cross hair pattern centered within the field of view of the camera assembly.

18. The device of claim 17 wherein the illumination assembly includes a targeting illumination arrangement and further wherein the targeting illumination arrangement includes a horizontal line illumination generating arrangement, including an illumination source and an optic, each supported by the modular housing and generating a thin horizontal illumination intensity distribution pattern substantially centered within the field of view of the camera assembly, and the targeting illumination arrangement further including a vertical line illumination generating arrangement, including an illumination source and an optic, each supported by the modular housing and generating a thin vertical illumination intensity distribution pattern centered within the field of view of the camera assembly.

19. The device of claim 18, wherein the horizontal illumination intensity distribution pattern and the vertical illumination intensity distribution pattern extend approximately the width and the height of the target area respectively.

20. The device of claim 18 wherein the horizontal line illumination generating optic includes an aspheric optic entry surface and a cylindrical optic exit surface with a substantially vertical longitudinal axis and the vertical line illumination generating optic includes an aspheric optic entry surface and a cylindrical optic exit surface with a substantially horizontal longitudinal axis.

* * * * *